US008680229B2

(12) United States Patent
Maeda et al.

(10) Patent No.: US 8,680,229 B2
(45) Date of Patent: Mar. 25, 2014

(54) METHOD FOR PRODUCING POLYESTER

(71) Applicant: Mitsubishi Chemical Corporation, Chiyoda-ku (JP)

(72) Inventors: Naoya Maeda, Mie (JP); Shinichiro Matsuzono, Mie (JP); Takayuki Suzuki, Mie (JP); Hiromichi Matsui, Mie (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 13/851,592

(22) Filed: Mar. 27, 2013

(65) Prior Publication Data
US 2013/0211037 A1    Aug. 15, 2013

Related U.S. Application Data

(60) Provisional application No. PCT/JP2011/071910, filed on Sep. 26, 2011.

(30) Foreign Application Priority Data

Sep. 27, 2010 (JP) .................................. 2010-215641

(51) Int. Cl.
*C08G 63/02* (2006.01)
*C08G 63/00* (2006.01)

(52) U.S. Cl.
USPC ............. 528/272; 264/344; 521/48; 528/271; 528/274; 528/275; 528/279; 528/496; 528/499

(58) Field of Classification Search
USPC ................. 528/272, 274, 275, 279, 496, 499; 264/344; 521/48
See application file for complete search history.

(56) References Cited

U.S. PATENT DOCUMENTS 7,317,069 B2 *  1/2008  Aoshima et al. .............. 528/275

FOREIGN PATENT DOCUMENTS

| JP | 07-316276 |   | 12/1995 |
|----|-----------|---|---------|
| JP | 2004-107457 | * | 4/2004 |
| JP | 2005-162890 | * | 6/2005 |
| JP | 2010-195989 | * | 9/2010 |

OTHER PUBLICATIONS

International Search Report issued Dec. 6, 2011 in PCT/JP2011/071910 filed Sep. 26, 2011.

* cited by examiner

*Primary Examiner* — Terressa Boykin
(74) *Attorney, Agent, or Firm* — Oblon, Spivak, McClelland, Maier & Neustadt, L.L.P.

(57) ABSTRACT

The present invention is aimed to provide a method for producing a polyester with reduced CD content and elution amount, in which even after the production method, a reduction in physical properties of the polyester is small, and furthermore, a polyester having good moldability can be produced, and the present invention is concerned with a method for producing a polyester including an esterification reaction step of allowing an aliphatic diol and an aliphatic dicarboxylic acid to react with each other; a step of pelletizing a polyester obtained through the esterification reaction step; and a contact treatment step of bringing the obtained polyester pellets into contact with a mixed solution containing ethanol and water, wherein the mixed solution contains water in an amount of 10% by mass or more and not more than 99% by mass relative to the whole of the mixed solution.

13 Claims, 4 Drawing Sheets

METHOD FOR PRODUCING POLYESTER

TECHNICAL FIELD

The present invention relates to a method for producing a polyester composed of an aliphatic diol and an aliphatic dicarboxylic acid as main raw materials. In more detail, the present invention relates to a method for producing a polyester having a small content of an oligomer such as a cyclic dimer, etc.

BACKGROUND ART

A polyester composed of an aliphatic diol and an aliphatic dicarboxylic acid as main raw materials, as represented by polybutylene succinate (this polyester will be hereinafter sometimes abbreviated as "polyester"), is processed into products such as agricultural materials, civil engineering materials, vegetation materials, packaging materials, etc. and expected to be utilized over a wide range in view of the facts that it can request the raw materials in materials derived from plant resources; and that it has good physical properties and biodegradability, and the like.

However, a molded article made of the foregoing polyester involved such a problem that when allowed to stand for a certain period of time after molding, cloudiness (hereinafter sometimes referred to as "bleedout" or "whitening phenomenon") is generated on the surface thereof, whereby the surface gloss vanishes. It may be considered that such a problem is caused due to the fact that at the time of producing a polyester, a cyclic dimer (hereinafter sometimes referred to as "CD") which is formed simultaneously with the formation of the polyester is deposited on the surface of the molded article after molding and then elapsing a certain period of time. In addition, if the CD content is high, in the case where the polyester is molded into a beverage container or the like and subjected to an elution test by a content liquid, there is also a problem that the elution amount is high so that such a polyester is not suited for containers. Accordingly, a method for eliminating the cyclic dimer from the polyester is studied.

Patent Document 1 describes a method for reducing the CD content by treating a polyester with acetone. In addition, Patent Document 2 describes a method for reducing the CD content by treating a polyester in the form of a powder, a pellet or a molded article with an alcohol or a water/alcohol mixed solution composed of an alcohol as a main component and describes methanol or isopropanol as a specifically applicable alcohol. Furthermore, Patent Document 2 describes a treatment method with a water/alcohol mixed solution composed of water as a main component.

BACKGROUND ART DOCUMENT

Patent Document

Patent Document 1: JP-A-2004-107457
Patent Document 2: JP-A-7-316276

SUMMARY OF INVENTION

Problem that Invention is to Solve

In the case of treating a polyester with acetone for the purpose of reducing the CD content, in view of a problem of an offensive smell due to acetone remaining in pellets after the treatment, or the like, there was involved such a problem that excessive equipment is necessary such that a water treatment step is separately required after the treatment with acetone, or the like.

In addition, in the case of treating a polyester in the form of a powder, a pellet or a molded article with an alcohol or a water/alcohol mixed solution composed of an alcohol as a main component, in particular, in the case of using methanol or isopropanol as the alcohol, there were involved such problems that the effect for reducing the CD content is not necessarily satisfactory; that the treatment time is long; and the like. Furthermore, in the case of using isopropanol, there was involved such a problem that isopropanol is liable to remain in the pellets in drying after the contact treatment, so that when the pellets are melt molded, the melt viscosity decreases. In addition, there is a method in which in order to efficiently reduce the CD, the treatment temperature is more increased. In that case, however, there was such a problem that the hydrolysis of the polyester at the time of contact treatment is so large that there is a concern of impairment in physical properties such as a reduction of molecular weight, etc.

In view of the foregoing problems, a problem of the present invention is to provide a method for producing a polyester with reduced CD content and elution amount, in which even after the production method, a reduction in physical properties of the polyester is small, and furthermore, a polyester having good moldability can be produced.

Means for Solving Problem

In order to solve the foregoing problems, the present inventors made extensive and intensive investigations. As a result, it has been found that when polyester pellets obtained by pelletizing a polyester obtained through an esterification reaction step of allowing an aliphatic diol and an aliphatic dicarboxylic acid to react with other is contact treated with a mixing solution containing ethanol and water in a content of water of 10% by mass or more and not more than 99% by mass relative to the whole of the mixed solution, the CD contained in the polyester can be efficiently removed, leading to accomplishment of the present invention.

Specifically, the gist of the present invention resides in the following [1] to [7].

[1] A method for producing a polyester, comprising:
an esterification reaction step of allowing an aliphatic diol and an aliphatic dicarboxylic acid to react with each other;
a step of pelletizing a polyester obtained through the esterification reaction step; and
a contact treatment step of bringing obtained polyester pellets into contact with a mixed solution containing ethanol and water,
wherein the mixed solution contains water in an amount of 10% by mass or more and not more than 99% by mass relative to the whole of the mixed solution.

[2] The method for producing a polyester as described in [1] above,
wherein a temperature at which the polyester pellets are brought into contact with the mixed solution is 25° C. or higher and not higher than a melting point of the polyester.

[3] The method for producing a polyester as described in [1] or [2] above,
wherein an oligomer extracted into the mixed solution by the contact of the polyester pellets with the mixed solution is used as a raw material of the polyester.

[4] The method for producing a polyester as described in any one of [1] to [3] above, wherein the mixed solution contains isopropanol in an amount of not more than 15% by mass relative to the whole amount of the mixed solution.

[5] The method for producing a polyester as described in any one of [1] to [4] above, comprising:

a drying step after the contact treatment step, wherein the polyester after the drying step contains not more than 1,000 ppm by mass of ethanol.

[6] A polyester obtained by the production method as described in any one of [1] to [5] above, which has an intrinsic viscosity of 1.4 dL/g or more and not more than 2.8 dL/g and a content of a cyclic dimer of 500 ppm by mass or more and not more than 6,000 ppm by mass.

[7] The polyester as described in [6] above, which has a terminal carboxyl group concentration of not more than 80 (equivalents/ton) and 5 (equivalents/ton) or more.

Effects of Invention

According to the present invention, it is possible to provide a method for producing a polyester with reduced CD content and elution amount, which has excellent polyester physical properties and further has good moldability.

MODE FOR CARRYING OUT INVENTION

Figure 1:
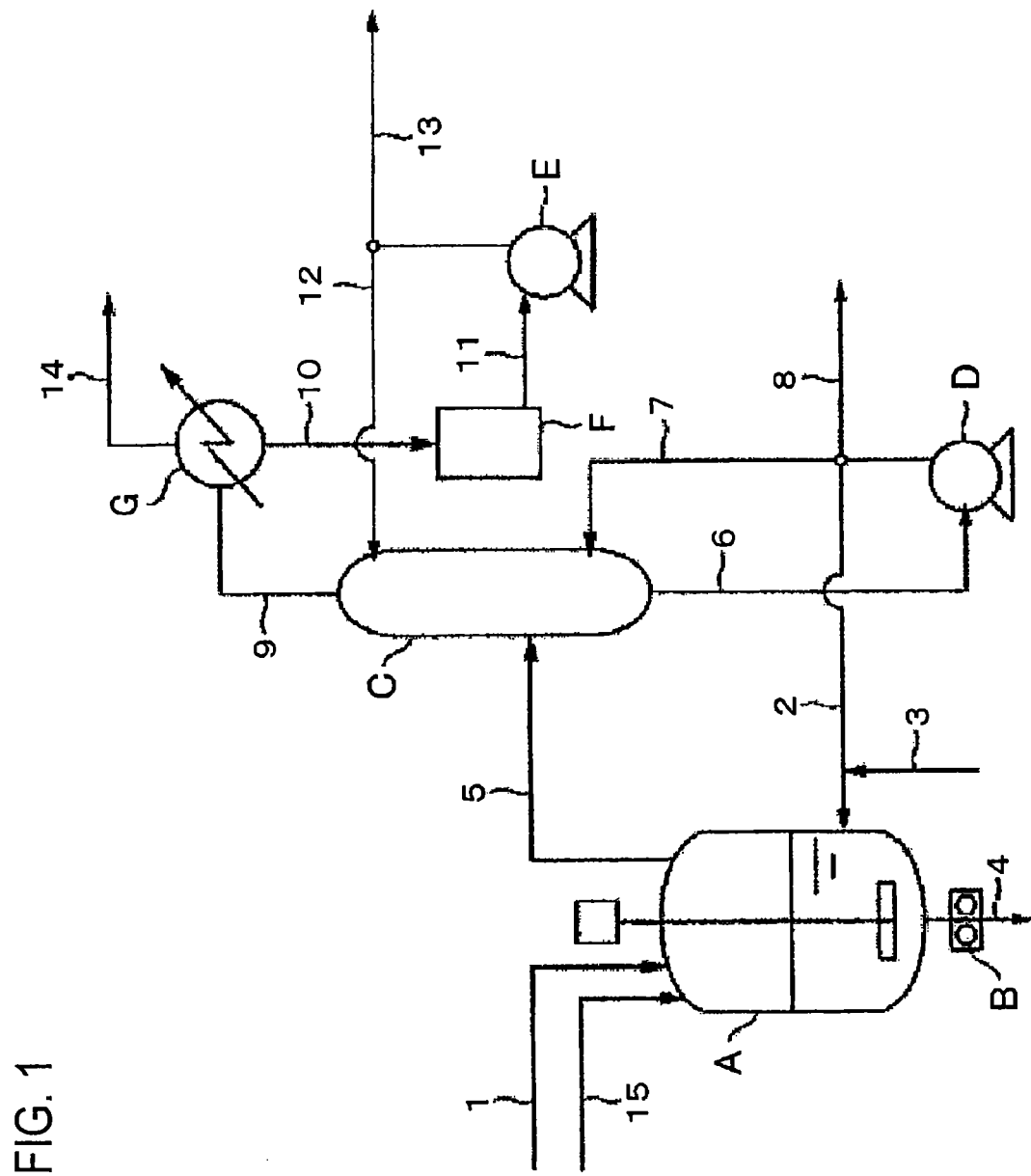
FIG. 1 is a diagrammatic view showing an exemplary embodiment of an esterification reaction step which is adopted in the present invention.

In the present description, the terms "% by mass", "ppm by mass", and "parts by mass" are synonymous with "% by weight", "ppm by weight", and "parts by weight", respectively.

The production method according to the present invention is a method for producing a polyester including a contact treatment step in which a polyester obtained through an esterification reaction step of allowing at least aliphatic diol and an aliphatic dicarboxylic acid to react with each other is pelletized, and the obtained polyester pellets are brought into contact with a mixed solution containing ethanol and water, wherein the mixed solution contains water in an amount of 10% by mass or more and not more than 99% by mass relative to the whole of the mixed solution. The production method according to the present invention includes an esterification reaction step of allowing at least an aliphatic diol and an aliphatic dicarboxylic acid as main raw materials to react with each other. The terms "an aliphatic diol and an aliphatic dicarboxylic acid as main raw materials" mean that a diol component to be used as the raw material is one composed of an aliphatic diol as a main component; and that a dicarboxylic acid component to be used as the raw material is one composed of an aliphatic dicarboxylic acid as a main component.

Here, the terms "composed of an aliphatic diol as a main component" mean that "a total molar ratio of the aliphatic diol is the largest among raw material diols". Above all, from the viewpoints of physical properties and biodegradability of the polyester, the total sum of the aliphatic diols is preferably 50% by mole or more, more preferably 60% by mole or more, still more preferably 70% by mole or more, and especially preferably 90% by mole or more relative to the total sum of the raw material diols.

In addition, in the present invention, the terms "composed of an aliphatic dicarboxylic acid as a main raw material" mean that at least one of an aliphatic dicarboxylic acid and an aliphatic dicarboxylic acid alkyl ester is used as a main component. The terms "at least one of an aliphatic dicarboxylic acid and an aliphatic dicarboxylic acid alkyl ester is used as a main component" mean that "a total molar ratio of the aliphatic dicarboxylic acid and the aliphatic dicarboxylic acid alkyl ester is the largest in the total sum of raw material dicarboxylic acids and dicarboxylic acid alkyl esters". Above all, from the viewpoints of physical properties and biodegradability of the polyester, the total sum of the aliphatic dicarboxylic acids and the aliphatic dicarboxylic acid alkyl esters is preferably 50% by mole or more, more preferably 60% by mole or more, still more preferably 70% by mole or more, and especially preferably 90% by mole or more relative to the total sum of the raw material dicarboxylic acids.

Furthermore, as for the aliphatic diol and the aliphatic dicarboxylic acid, it is preferable that 50% by mole or more of all of the dicarboxylic acid components constituting the polyester according to the present invention is occupied by the aliphatic dicarboxylic acid; and that 50% by mole or more of all of the diol components constituting the polyester according to the present invention is occupied by the aliphatic diol. In the present invention, each of the reaction steps at the time of producing a polyester can be carried out by any of a batchwise method or a continuous method. However, from the viewpoints of stabilization of the quality and energy efficiency, a so-called continuous method of continuously supplying the raw materials to continuously obtain the polyester is preferable.

<Diol Component>

As described previously, at least an aliphatic diol is used as the diol component which is used in the present invention, and so far as the total molar ratio thereof is the largest in the raw material diols, those which are generally used for raw materials of polyesters can be used without particular limitations.

More specifically, examples thereof include alkylene diols such as ethylene glycol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, neopentyl glycol, etc.; oxyalkylene diols such as diethylene glycol, polyethylene glycol, polypropylene glycol, polytetramethylene ether glycol, etc.; and cycloalkylene diols such as 1,2-cyclohexanediol, 1,4-cyclohexanediol, 1,2-cyclohexanedimethanol, 1,4-cyclohexanedimethanol, etc. Of these, from the standpoint of physical properties of the obtained polyester, alkylene diols having a carbon number of not more than 6, such as ethylene glycol, 1,3-propanediol, 1,4-butanediol, etc., or cycloalkylene diols having a carbon number of not more than 6, such as 1,4-cyclohexanedimethanol, etc. are preferable. Above all, 1,4-butanediol is especially preferable. Incidentally, these may be used in combination of two or more kinds thereof. In the case of using 1,4-butanediol as the diol component, from the viewpoints of melting point (heat resistance), biodegradability, and kinetic characteristics of the obtained polyester, the use amount of 1,4-butanediol is preferably 50% by mole or more, more preferably 70% by mole or more, and especially preferably 90% by mole or more relative to all of the aliphatic diols. Furthermore, as for ethylene glycol, 1,3-propanediol, and 1,4-butanediol, materials derived from plant raw materials can be used.

<Dicarboxylic Acid Component>

As described previously, at least an aliphatic dicarboxylic acid is used as the dicarboxylic acid component which is used in the present invention, and so far as the total molar ratio thereof is the largest among the raw material carboxylic acids, those which are generally used for raw materials of polyesters can be used without particular limitations.

More specifically, examples thereof include aliphatic dicarboxylic acids such as oxalic acid, malonic acid, succinic acid, succinic anhydride, glutaric acid, adipic acid, pimelic acid, suberic acid, azelaic acid, sebacic acid, undecadicarboxylic acid, dodecadicarboxylic acid, dimer acid, etc.; and aromatic dicarboxylic acids such as hexahydrophthalic acid, hexahydroisophthalic acid, hexahydroterephthalic acid, etc. Of these, from the standpoint of physical properties of the obtained polyester, aliphatic dicarboxylic acids such as succinic acid, succinic anhydride, adipic acid, sebacic acid, etc. are preferable. Aliphatic dicarboxylic acids having a carbon number of not more than 4, such as succinic acid, succinic anhydride, etc., are especially preferable. Incidentally, these may be used in combination of two or more kinds thereof.

In the case of using succinic acid as the dicarboxylic acid component, from the viewpoints of melting point (heat resistance), biodegradability, and kinetic characteristics of the obtained polyester, the use amount of succinic acid is preferably 50% by mole or more, more preferably 70% by mole or more, and especially preferably 90% by mole or more relative to all of the aliphatic dicarboxylic acids. In addition, an aromatic dicarboxylic acid may be used in combination as the dicarboxylic acid component other than the aliphatic dicarboxylic acid. Specific examples of the aromatic dicarboxylic acid include terephthalic acid, isophthalic acid, naphthalenedicarboxylic acid, diphenyldicarboxylic acid, and the like. These may be added either alone or in admixture of two or more kinds thereof to the foregoing aliphatic dicarboxylic acid and used. In addition, as for succinic acid, succinic anhydride, adipic acid, and the like, materials derived from plant raw materials can be used.

<Other Copolymerization Component>

For the polyester according to the present invention, other constituent component than the aliphatic diol and the aliphatic dicarboxylic acid may be copolymerized. In that case, examples of the copolymerization component which can be used include oxycarboxylic acids such as lactic acid, glycolic acid, hydroxybutyric acid, hydroxycaproic acid, 2-hydroxy-3,3-dimethylbutyric acid, 2-hydroxy-3-methylbutyric acid, 2-hydroxyisocaproic acid, malic acid, maleic acid, citric acid, fumaric acid, etc., esters or lactones of these oxycarboxylic acids, oxycarboxylic acid polymers, and the like; trifunctional or higher-functional polyhydric alcohols such as glycerin, trimethylolpropane, pentaerythritol, etc.; trifunctional or higher-functional polyvalent carboxylic acids or anhydrides thereof such as propanetricarboxylic acid, pyromellitic acid, trimellitic acid, benzophenonetetracarboxylic acid, and anhydrides thereof, etc.; and the like. In addition, by adding a small amount of a trifunctional or higher-functional oxycarboxylic acid, trifunctional or higher-functional alcohol, a trifunctional or higher-functional carboxylic acid, or the like, a high-viscosity polyester is liable to be obtained. Above all, oxycarboxylic acids such as malic acid, citric acid, fumaric acid, etc. are preferable, and in particular, malic acid is preferably used.

The amount of the trifunctional or higher-functional polyfunctional compound is preferably from 0.001 to 5% by mole, and more preferably from 0.05 to 0.5% by mole relative to all of the dicarboxylic acid components. When the amount of the trifunctional or higher-functional polyfunctional compound is more than the upper limit of this range, a gel (unmelted material) is liable to be formed in the polyester, whereas when it is less than the lower limit, an advantage to be brought due to the use of the polyfunctional compound (in general, it becomes possible to increase the viscosity of the obtained polyester) is hardly obtained.

<Physical Properties of Polyester>

In the present invention, a lower limit of an intrinsic viscosity (IV, dL/g) of the polyester pellets to be contact treated with the mixed solution containing ethanol and water is preferably 1.4 dL/g, and especially preferably 1.6 dL/g. An upper limit thereof is preferably 2.8 dL/g, more preferably 2.5 dL/g, and especially preferably 2.3 dL/g. When the intrinsic viscosity is less than the lower limit, at the time of forming into a molded article, a sufficient mechanical strength is hardly obtained. When the intrinsic viscosity is more than the upper limit, at the time of molding, the melt viscosity is so high that molding is hardly achieved.

In the present invention, the terminal carboxyl group concentration of the polyester to be contact treated with the mixed solution containing ethanol and water is generally not more than 80 (equivalents/ton), preferably not more than 60 (equivalents/ton), more preferably not more than 40 (equivalents/ton), and especially preferably not more than 25 (equivalents/ton). Although when a lower limit thereof is lower, thermal stability and hydrolysis resistance become better, it is generally 5 (equivalents/ton) or more. When the terminal carboxyl group concentration of the polyester is more than the upper limit, there is a concern that a reduction of the viscosity to be caused due to the hydrolysis becomes remarkable, thereby conspicuously impairing the quality.

<Production Method of Polyester>

The production method of a polyester which is used in the contact step of the present invention is hereunder described by reference to the following continuous production method.

In the production method of a polyester which is used in the contact step of the present invention, a continuous production method is concerned with a method in which an aliphatic dicarboxylic acid and an aliphatic diol are subjected to an esterification reaction step and a melt polycondensation reaction step using continuous plural reaction tanks, thereby continuously obtaining polyester pellets. However, so far as the effects of the present invention are not impaired, the production method of a polyester is not limited to the continuous method, and conventionally known production methods of a polyester can be adopted. The polyester pellets are contact treated with a mixed solution containing ethanol and water, followed by drying.

<Esterification Reaction Step>

In the production method of a polyester which is used in the contact step of the present invention, the polyester to be used is produced through an esterification reaction step of allowing at least a dicarboxylic acid component and a diol component to react with other. The esterification reaction step and the sequential other steps can be carried out in any of continuous plural reaction tanks or a single reaction tank. However, in order to minimize variations in physical properties of the obtained polyester, it is preferable to carry out these steps in continuous plural reaction tanks.

A reaction temperature in the esterification reaction step is not particularly limited so far as it is a temperature at which the esterification reaction can be carried out. However, from the standpoint that the reaction rate can be increased, the reaction temperature is preferably 200° C. or higher, and more preferably 210° C. or higher. In order to prevent coloration of the polyester, or the like, the reaction temperature is preferably not higher than 250° C., more preferably not higher than 245° C., and especially preferably not higher than 240° C. When the reaction temperature is too low, the esterification reaction rate is slow, a long time is required for the reaction time, and undesirable reactions such as dehydration decomposition of the aliphatic diol, etc. frequently occur. In addition, when the reaction temperature is too high, decomposition of the aliphatic diol or aliphatic dicarboxylic acid frequently occurs. In addition, scattered materials increase in the reaction tank, thereby likely causing the generation of extraneous matters, and cloudiness (haze) is liable to be caused in the reaction production. In addition, it is preferable that the esterification temperature is a fixed temperature. When the esterification temperature is a fixed temperature, an esterification rate becomes stable. The fixed temperature as referred to herein is a (setting temperature±5° C.), and preferably a (setting temperature±2° C.).

The reaction atmosphere is preferably an atmosphere of an inert gas such as nitrogen, argon, etc. The reaction pressure is preferably from 50 kPa to 200 kPa, more preferably 60 kPa or more, and still more preferably 70 kPa or more, and more preferably not more than 130 kPa, and still more preferably not more than 110 kPa. When the reaction pressure is less than the lower limit, scattered materials increase in the reaction tank, and the haze of the reaction product becomes high, thereby likely causing an increase of extraneous matters. In addition, distillation of the aliphatic diol to outside the reaction system frequently occurs, thereby likely causing a decrease of the polycondensation reaction rate. When the reaction pressure is more than the upper limit, dehydration decomposition of the aliphatic diol frequently occurs, thereby likely causing a decrease of the polycondensation rate.

The reaction time is preferably one hour or more, and an upper limit thereof is preferably not more than 10 hours, and more preferably not more than 4 hours. A molar ratio of the aliphatic diol component to the aliphatic dicarboxylic acid component for undergoing the esterification reaction expresses a molar ratio of the aliphatic diol and the esterified aliphatic diol to the aliphatic dicarboxylic acid and the esterified aliphatic dicarboxylic acid present in a gas phase and a reaction solution phase in an esterification reaction tank. In this regard, the aliphatic dicarboxylic acid and the aliphatic diol, and decomposition products thereof, which are decomposed in the reaction system, thereby not contributing to the esterification reaction, are not included. As for the terms "which are decomposed, thereby not contributing to the esterification reaction", for example, tetrahydrofuran resulting from decomposition of 1,4-butanediol that is the aliphatic diol is not included in this molar ratio. In the present invention, a lower limit of the foregoing molar ratio is generally 1.10 or more, preferably 1.12 or more, more preferably 1.15 or more, and especially preferably 1.20 or more. An upper limit thereof is generally not more than 2.00, preferably not more than 1.80, more preferably not more than 1.60, and especially preferably not more than 1.55. When the molar ratio is less than the lower limit, the esterification reaction is liable to become insufficient, and the polycondensation reaction that is a reaction of the subsequent step hardly proceeds, so that a polyester with a high degree of polymerization is hardly obtained. When the molar ratio is more than the upper limit, the decomposition amount of the aliphatic diol or aliphatic dicarboxylic acid tends to increase. In order to keep this molar ratio within the preferred range, it is a preferable way to properly replenish the aliphatic diol into the esterification reaction system.

In the present invention, the esterification reaction product having an esterification ratio of 80% or more is provided for the polycondensation reaction. In the present invention, the polycondensation reaction refers to a polymerization reaction of polyester which is carried out at a reaction pressure of not more than 50 kPa; the esterification reaction is generally carried out at from 50 to 200 kPa in an esterification reaction tank; and the polycondensation reaction is carried out at not more than 50 kPa, and preferably not more than 10 kPa in a polycondensation reaction tank. The esterification ratio as referred to in the present invention shows a proportion of the esterified acid component relative to all of the acid components in an esterification reaction product sample and is expressed according to the following equation.

Esterification ratio (%)={(Saponification value)−(Acid value)}/(Saponification value)×100

The esterification ratio of the esterification reaction product is preferably 85% or more, more preferably 88% or more, and especially preferably 90% or more. When the esterification ratio is less than the lower limit, the reactivity of the polycondensation that is a reaction of the subsequent step is deteriorated. In addition, at the time of polycondensation reaction, scattered materials increase, attach to the wall surface, and are solidified. Furthermore, the scattered materials fall in the reaction product, thereby causing deterioration of the haze (generation of extraneous matters). For the polycondensation reaction that is a reaction of the subsequent step, it is preferable that an upper limit of the esterification ratio is higher, and it is generally 99%.

In the present invention, by carrying out the continuous reaction while allowing the molar ratio between the dicarboxylic acid and the diol, the reaction temperature, the reaction pressure, and the rate of reaction in the esterification reaction to fall within the foregoing ranges, respectively, followed by continuously providing for the polycondensation reaction, it is possible to efficiently obtain a high-quality polyester with low haze and less extraneous matters.

<Polycondensation Reaction Step>

In the production of a polyester which is used in the contact step of the present invention, it is preferable to carry out a polycondensation reaction in the polycondensation reaction step subsequent to the esterification reaction step. The polycondensation reaction can be carried out under reduced pressure using continuous plural reaction tanks. As for the reaction pressure of a final polycondensation reaction tank, a lower limit thereof is generally 0.01 kPa or more, and preferably 0.03 kPa or more, and an upper limit thereof is generally not more than 1.4 kPa, and preferably not more than 0.4 kPa. When the pressure at the time of polycondensation reaction is too high, the polycondensation time becomes long, and following this, a reduction of the molecular weight or coloration of the polyester is caused due to thermal decomposition, so that the production of a polyester exhibiting sufficient characteristics from the standpoint of practical use tends to become difficult.

On the other hand, a technique for the production using extreme high vacuum polycondensation equipment so as to control the reaction pressure to less than 0.01 kPa is a preferred embodiment from the viewpoint of enhancing the polycondensation reaction rate. However, an extremely expensive investment in equipment is necessary, and hence, such is economically disadvantageous. The reaction temperature is in the range such that a lower limit thereof is generally 215° C., and preferably 220° C., whereas an upper limit thereof is generally 270° C., and preferably 260° C. When the reaction temperature is lower than the lower limit, not only the polycondensation reaction rate is so slow that it takes a long time to produce a polyester with a high degree of polymerization, but a high-power stirring machine is necessary, and hence, such is economically disadvantageous. On the other hand, when the reaction temperature is higher than the upper limit, thermal decomposition of the polyester at the time of production is liable to be caused, and the production of a polyester with a high degree of polymerization tends to become difficult.

As for the reaction time, a lower limit thereof is generally one hour, and an upper limit thereof is generally 15 hours, preferably 10 hours, and more preferably 8 hours. When the reaction time is too short, the reaction is so insufficient that a polyester with a high degree of polymerization is hardly obtained, and mechanical physical properties of a molded article thereof tend to become deteriorated. On the other hand, when the reaction time is too long, not only a reduction of the molecular weight of the polyester to be caused due to thermal decomposition becomes remarkable, so that mechanical physical properties of a molded article thereof tend to be deteriorated, but there is a concern that the concentration of a terminal carboxyl group which adversely affects the durability of the polyester increases due to thermal decomposition.

By controlling the polycondensation reaction temperature and time and the reaction pressure, it is possible to obtain a polyester having a desired intrinsic viscosity.

<Reaction Catalyst>

In each of the esterification reaction and the polycondensation reaction, the reaction is promoted by using a reaction catalyst. In the esterification reaction, a sufficient reaction rate can be obtained even without using an esterification reaction catalyst. In addition, when the esterification reaction catalyst is present at the time of esterification reaction, there is a concern that the catalyst produces a deposit which is insoluble in the reaction product due to water produced by the esterification reaction, thereby impairing the transparency of the obtained polyester (namely, increasing the haze), and there is also a concern that the catalyst is formed into an extraneous matter. Thus, it is preferable that the reaction catalyst is not added and used during the esterification reaction. In addition, when the catalyst is added to a gas phase part of the reaction tank, there is a concern that the haze increases, and there is also a concern that the catalyst is formed into an extraneous matter. Thus, it is preferable to add the catalyst in the reaction solution.

In the polycondensation reaction, the reaction hardly proceeds in the absence of a catalyst, and hence, it is preferable to use a catalyst. In general, a compound containing at least one member among metal elements belong to the groups 1 to 14 of the periodic table is used as the polycondensation reaction catalyst. Specifically, examples of the metal element include scandium, yttrium, samarium, titanium, zirconium, vanadium, chromium, molybdenum, tungsten, tin, antimony, cerium, germanium, zinc, cobalt, manganese, iron, aluminum, magnesium, calcium, strontium, sodium, potassium, and the like. Of these, scandium, yttrium, titanium, zirconium, vanadium, molybdenum, tungsten, zinc, iron, and germanium are preferable; and titanium, zirconium, tungsten, iron and germanium are especially preferable. Furthermore, in order to reduce the concentration of the polyester terminal which influences thermal stability of the polyester, among the foregoing metals, metal elements belonging to the groups 3 to 6 of the periodic table and exhibiting the Lewis acidity are preferable. Specifically, examples thereof include scandium, titanium, zirconium, vanadium, molybdenum, and tungsten. In particular, from the standpoint of easiness of availability, titanium and zirconium are preferable, and furthermore, from the standpoint of reaction activity, titanium is preferable.

In the present invention, compounds containing an organic group, such as carboxylic acid salts, alkoxy salt organic sulfonic acid salts, or β-diketonate salts each containing such a metal element, etc.; and furthermore, inorganic compounds such as oxides, halides, and the like of the foregoing metals and mixtures thereof are preferably used as the catalyst.

In the present invention, from the reason that when the catalyst is in a molten or dissolved state at the time of polymerization, the polymerization rate becomes high, a compound which is liquid or soluble in an ester low polymer or polyester at the time of polymerization is preferable. In addition, it is preferable to carry out the polycondensation in the absence of a solvent. However, separately from this, in order to dissolve the catalyst, a small amount of a solvent may be used. Examples of this solvent for use in catalyst dissolution include alcohols such as methanol, ethanol, isopropanol, butanol, etc.; the foregoing diols such as ethylene glycol, butanediol, pentanediol, etc.; ethers such as diethyl ether, tetrahydrofuran, etc.; nitriles such as acetonitrile, etc.; hydrocarbon compounds such as heptane, toluene, etc.; water; and mixtures thereof and the like. As for the use amount thereof, the solvent is used in such a manner that the catalyst concentration is generally 0.0001% by mass or more and not more than 99% by mass.

As the titanium compound, a tetraalkyl titanate and a hydrolyzate thereof are preferable. Specifically, examples thereof include tetra-n-propyl titanate, tetraisopropyl titanate, tetra-n-butyl titanate, tetra-t-butyl titanate, tetraphenyl titanate, tetracyclohexyl titanate, tetrabenzyl titanate, and mixed titanates thereof, and hydrolyzates thereof.

In addition, titanium (oxy)acetyl acetonate, titanium tetraacetyl acetonate, titanium (diisopropoxide)acetyl acetonate, titanium bis(ammonium lactate)dihydroxide, titanium bis(ethyl acetoacetate)diisopropoxide, titanium (triethanolaminate) isopropoxide, polyhydroxytitanium stearate, titanium lactate, titanium triethanolaminate, butyl titanate dimer, and the like are preferably used. In addition, liquid materials obtained by mixing an alcohol, a group 2 metal compound in the long-form periodic table (*Nomenclature of Inorganic Chemistry IUPAC Recommendations* 2005) (hereinafter sometimes referred to as "group 2 metal compound in the long-form periodic table"), a phosphoric ester compound, and a titanium compound are also used.

Of these, tetra-n-propyl titanate, tetraisopropyl titanate, tetra-n-butyl titanate, titanium (oxy)acetyl acetonate, titanium tetraacetyl acetonate, titanium bis(ammonium lactate) dihydroxide, polyhydroxytitanium stearate, titanium lactate, butyl titanate dimer, and a liquid material obtained by mixing an alcohol, a group 2 metal compound in the long-form periodic table, a phosphoric ester compound, and a titanium compound are preferable; tetra-n-butyl titanate, titanium (oxy) acetyl acetonate, titanium tetraacetyl acetonate, polyhydroxytitanium stearate, titanium lactate, butyl titanate dimer, and a liquid material obtained by mixing an alcohol, a group 2 metal compound in the long-form periodic table, a phosphoric ester compound, and a titanium compound are more preferable; and tetra-n-butyl titanate, polyhydroxytitanium stearate, titanium (oxy)acetyl acetonate, titanium tetraacetyl acetonate, and a liquid material obtained by mixing an alcohol, a group 2 metal compound in the long-form periodic table, a phosphoric ester compound, and a titanium compound are especially preferable.

Specifically, examples of the zirconium compound include zirconium tetraacetate, zirconium acetate hydroxide, zirconium tris(butoxy)stearate, zirconyl diacetate, zirconium oxalate, zirconyl oxalate, potassium zirconium oxalate, polyhydroxyzirconium stearate, zirconium ethoxide, zirconium tetra-n-propoxide, zirconium tetraisopropoxide, zirconium tetra-n-butoxide, zirconium tetra-t-butoxide, zirconium tributoxyacetyl acetonate, and mixtures thereof.

Of these, zirconyl diacetate, zirconium tris(butoxy)stearate, zirconium tetraacetate, zirconium acetate hydroxide, ammonium zirconium oxalate, potassium zirconium oxalate, polyhydroxyzirconium stearate, zirconium tetra-n-propoxide, zirconium tetraisopropoxide, zirconium tetra-n-butoxide, and zirconium tetra-t-butoxide are preferable; zirconyl diacetate, zirconium tetraacetate, zirconium acetate hydroxide, zirconium tris(butoxy)stearate, ammonium zirconium oxalate, zirconium tetra-n-propoxide, and zirconium tetra-n-butoxide are more preferable; and zirconium tris(butoxy)stearate is especially preferable for the reason that a colorless polyester with a high degree of polymerization is easily obtained.

Specifically, examples of the germanium compound include inorganic germanium compounds such as germanium oxide, germanium chloride, etc.; and organic germanium compounds such as a tetraalkoxygermanium, etc. From the standpoints of prices and easiness of availability, germanium oxide, tetraethoxygermanium, tetrabutoxygermanium, and the like are preferable, and germanium oxide is especially preferable.

Examples of the iron compound include inorganic chlorides such as ferric chloride, etc.; inorganic oxides such as triiron tetroxide, etc.; organic iron complexes such as ferrocene, etc.; and the like. Of these, inorganic oxides are preferable.

Examples of other metal-containing compounds include scandium compounds such as scandium carbonate, scandium acetate, scandium chloride, scandium acetyl acetonate, etc.; yttrium compounds such as yttrium carbonate, yttrium chloride, yttrium acetate, yttrium acetyl acetonate, etc.; vanadium compounds such as vanadium chloride, vanadium trichloride oxide, vanadium acetyl acetonate, vanadium acetyl acetonate oxide, etc.; molybdenum compounds such as molybdenum chloride, molybdenum acetate, etc.; tungsten compounds such as tungsten chloride, tungsten acetate, tungstic acid, etc.; lanthanoid compounds such as cerium chloride, samarium chloride, ytterbium chloride, etc.; and the like.

As for the addition amount of the catalyst in the case of using a metal compound as such a polycondensation catalyst, a lower limit value thereof is generally 0.1 ppm by mass or more, preferably 0.5 ppm by mass or more, and more preferably 1 ppm by mass or more, and an upper limit value thereof is generally not more than 3,000 ppm by mass, preferably not more than 1,000 ppm by mass, more preferably not more than 250 ppm by mass, and especially preferably not more than 130 ppm by mass, in terms of a metal amount relative to the formed polyester. Where the amount of the catalyst to be used is too high, such is economically disadvantageous. Additionally, although the reason is not elucidated yet, there may be the case where the terminal carboxyl group concentration in the polyester becomes high. Therefore, there is a concern that because of increases in the terminal carboxyl group concentration and the residual catalyst concentration, thermal stability and hydrolysis resistance of the polyester decrease. Conversely, where the amount of the catalyst to be used is too low, the polymerization activity decreases, and following this, thermal decomposition of the polyester is induced during the production of a polyester. As a result, a polyester showing practically useful physical properties is hardly obtained.

The position of addition of the catalyst to the reaction system is not particularly limited so far as it is located before the polycondensation reaction step. The catalyst may be added at the time of charging the raw materials. However, where the catalyst is co-present in a state where water is present in a large amount or is generated, the catalyst deactivates, resulting in precipitation of extraneous matters, and there is a concern that the quality of a product is impaired. Therefore, it is preferable to add the catalyst after the esterification reaction step.

<Reaction Tank>

As the esterification reaction tank which is used in the present invention, known tanks can be used, and the reaction tank can be any type of a vertical stirring complete mixing tank, a vertical heat convective mixing tank, a tower continuous reaction tank, or the like. In addition, the reaction tank may be a single tank or plural tanks constructed of the same kind or a different kind of tanks arranged in series. Above all, a reaction tank having a stirring apparatus is preferable, and as the stirring apparatus, high speed rotary stirring machines such as a turbine stator high speed rotary stirring machine, a disk mill stirring machine, a rotor mill stirring machine, etc. can be used, in addition to ordinary types constructed of a power section, a bearing, and a stirring blade.

The form of stirring is not limited. In addition to an ordinary stirring method of directly stirring the reaction solution in the reaction tank from an upper part, a lower part, a side part, or the like of the reaction tank, a method in which a part of the reaction solution is carried to the outside of the reaction tank by piping or the like and stirred with a line mixer or the like, and the reaction solution is then circulated can be used. The kind of the stirring blade can be selected among known blades. Specifically, examples thereof include a propeller blade, a screw blade, a turbine blade, a fan turbine blade, a disk turbine blade, a Pfaudler blade, a Fullzone blade, and a Maxblend blade, and the like.

The type of the polycondensation reaction tank which is used in the present invention is not particularly limited, and for example, a vertical stirring polymerization tank, a horizontal stirring polymerization tank, a thin film evaporation polymerization tank, and the like can be exemplified. The polycondensation reaction tank can be configured of a single tank, or can also be configured of plural tanks in which the same kind or a different kind of plural tanks are arranged in series. However, it is preferable to choose a horizontal stirring polymerization tank having a thin film evaporation function of excellent surface renewal properties, plug flow properties, and self-cleaning properties at the latter stage of polycondensation in which the viscosity of the reaction solution increases.

<Pelletization>

The polyester obtained through the polycondensation reaction is pelletized and contact treated in a state of pellets with a mixed solution containing ethanol and water.

As for the pelletization method, a strand cutting method in which the molten polyester is extruded from a nozzle hole of a die head using a gear pump or an extruder, and the strand is cut while cooling with water or the like or after cooling for solidification; an underwater hot cutting method in which the molten polyester is extruded into water from a nozzle hole and immediately cut in a molten state; and the like are widely adopted. In the polyester of the present invention, in view of the facts that offcuts are a little in the pellets; that the angle of repose of the obtained pellet is low; and that transport stability of the pellets and stability of feeding into a molding machine at the time of molding are good, an underwater hot cutting system is preferably adopted. As for the cooling water temperature in the underwater hot cutting system, a lower limit thereof is preferably 10° C. or higher, and more preferably 20° C. or higher, and an upper limit thereof is preferably not higher than 70° C., more preferably not higher than 60° C., and still more preferably not higher than 50° C.

As for the size of the nozzle hole, those having a hole diameter of from 1 mm to 30 mm are generally used. Though the shape of the aperture is not particularly limited, shapes such a circular shape, an oval shape, a large oval shape, a square shape, a star shape, etc. are used. In addition, the discharge amount per aperture is generally from 5 to 100 kg/hr, preferably from 10 to 70 kg/hr, and more preferably from 20 to 50 kg/hr.

Examples of the shape of the pellet include a spherical shape, a columnar shape, an elliptic cylindrical shape, a long cylindrical shape, a prismatic shape, a cocoon shape, and a flat shape thereof, and the like. In the underwater hot cutting system, the pellets are frequently formed into a spherical shape, a cocoon shape, or a flat shape thereof. Though the size thereof is not particularly limited, from the viewpoints of extraction efficiency of the CD by the contact treatment or drying efficiency of the drying step, transport operability of the pellets, and the like, the weight per pellet is from 1 to 50 mg, preferably from 3 to 40 mg, and more preferably from 5 to 30 mg. In addition, from the standpoint of extraction efficiency in the contact treatment step, it is preferable that a surface area of the pellet per mass is larger.

<Contact Treatment Step>

(Mixed Solution Containing Ethanol and Water)

In the present invention, by bringing the obtained pellets into contact with a mixed solution containing ethanol and water (hereinafter sometimes referred to as "contact treatment") and extracting the CD contained in the pellets into the mixed solution, the CD content in the pellets is reduced. Though the contact treatment step is generally continuously carried out after the pelletization, the contact treatment step may be carried out after temporarily storing the obtained pellets in a storage tank.

A proportion of water relative to the whole of the mixed solution containing ethanol and water (hereinafter sometimes referred to as "contact treatment solution"), which is brought into contact with the polyester pellets, is generally 10% by mass or more, preferably 20% by mass or more, and more preferably 25% by mass or more. In addition, it is generally not more than 99% by mass, preferably not more than 95% by mass, more preferably not more than 90% by mass, and especially preferably not more than 85% by mass.

When the mixing proportion of water is decreased (the proportion of ethanol is increased), the quality of the polyester tends to decrease due to a decrease of the molecular weight to be caused due to decomposition of the alcohol. In addition, when the use proportion of the alcohol is increased, because of an increase of explosion risk of the solution at the time of use and a gas generated from the solution, and the like, attention should be paid to handling from the viewpoint of safety. On the other hand, when the proportion of water exceeds the upper limit, there is a concern that the removal of an oligomer is not sufficient, and the CD content may not be sufficiently reduced, so that a polyester having a desired quality is not obtained.

The contact treatment solution which is used in the present invention can contain isopropanol. Its content is generally not more than 20% by mass, preferably not more than 15% by mass, and more preferably not more than 10% by mass. When the isopropanol content exceeds the upper limit, there is a concern that the removal of an oligomer is not sufficient, so that a polyester having a desired quality is not obtained.

(Contact Temperature)

As for the temperature of the contact solution at which the polyester pellets and the contact treatment solution are brought into contact with each other, a lower limit thereof is 25° C., preferably 30° C., more preferably 35° C., and especially preferably 40° C. An upper limit thereof is generally a melting point of the polyester, preferably 95° C., more preferably 90° C., and especially preferably 85° C. When the contact temperature is lower than the lower limit, a long time is required for the treatment time, and such is economically disadvantageous. Additionally, there is a concern that a desired polymer is not obtained due to a decrease of the removal effect of an oligomer. On the other hand, when the contact temperature exceeds the upper limit, a decrease of the viscosity becomes large due to hydrolysis and decomposition of the alcohol, whereby the quality is impaired. Additionally, fusion between the pellets, pellet extraction failure, and the like are caused, resulting in difficulty from the operation standpoint.

(Contact Time)

As for the time of bringing the polyester pellets and the contact treatment solution into contact with each other, a lower limit thereof is generally 0.1 hours, preferably 1 hour, and more preferably 3 hours. An upper limit thereof is generally 24 hours, preferably 18 hours, and more preferably 10 hours. When the contact time is less than the lower limit, there is a concern that the removal of an oligomer is not sufficient, so that a polyester having a desired quality is not obtained. On the other hand, when the contact time exceeds the upper limit, there is a concern that a decrease of the viscosity becomes large due to hydrolysis and decomposition of the alcohol, whereby the quality is impaired.

(Ratio Between Polyester Pellets and Contact Treatment Solution)

As for a ratio between the polyester pellets to be contacted and the contact treatment solution {(treatment solution)/(pellets) ratio}, a lower limit thereof is generally 1.0 or more, preferably 1.5 or more, and more preferably 2.0 or more in terms of a mass ratio. An upper limit thereof is generally not more than 50, preferably not more than 30, and more preferably not more than 20. When the mass ratio between the pellets to be contacted and the solution is less than the lower limit, there is a concern that the CD removal effect decreases due to an increase of the CD concentration in the treatment solution during the treatment, so that a polyester having a desired quality is not obtained. On the other hand, when the mass ratio between the pellets to be contacted and the solution exceeds the upper limit, such is disadvantageous from the standpoints of process and costs because of an increase in size of equipment to be caused due to a large amount of the contact treatment solution to be used, an increase in costs of the contact treatment solution, and the like.

(Contact Method)

As for embodiments of brining the polyester pellets and the contact treatment solution into contact with each other, there are a batchwise type and a continuous type, and all of these embodiments can be adopted.

Examples of the embodiment of a batchwise type in the present invention include a method in which the pellets and the contact treatment solution are charged in a treatment tank and subjected to a contact treatment at a prescribed temperature for a prescribed time, followed by extraction. The treatment can be carried out under either circulation or non-circulation of the contact treatment solution during the contact treatment of the pellets with the contact treatment solution. Examples of the embodiment of a continuous type in the present invention include a method in which the contact treatment solution at a prescribed temperature is brought into contact with the pellets in a concurrent or countercurrent manner against the flow of the pellets while continuously supplying the pellets into a piping or a treatment tank, and the pellets are continuously extracted while keeping for a prescribed contact time; and the like.

In the present invention, the contact treatment solution after the contact treatment can be recycled and used upon recovery by means of distillation. In addition, the extracted cyclic dimer-containing oligomer is separated from the contact treatment solution by means of cooling or the like, or concentrated, and then supplied into the esterification reaction step or the polycondensation reaction step, whereby it can be used as a raw material of the polyester. It is a preferred method to return the resulting oligomer into an esterification reaction tank of the esterification reaction step or a slurry tank of an aliphatic dicarboxylic acid and an aliphatic diol.

As for the contact treatment solution after the contact treatment, the extracted contact treatment solution can be circulated and reused as it is, or a part of the extracted contact treatment solution is disposed, and a contact treatment solution can be newly replenished in an amount corresponding to the disposed amount.

The CD-containing oligomer which after the contact treatment, has been separated from the contact treatment solution by means of distillation/concentration and/or cooling, or the like is once formed in a molten state or is dissolved under heating in the aliphatic diol as the raw material to form a solution, and thereafter, the resulting oligomer can be recovered as a raw material of the polyester. The recovered oligomer can be directly supplied into the esterification reaction tank, or can also be supplied into a recirculation line (2) of an aliphatic diol and an extraction line (4) of esterification reaction product illustrated in FIG. 1. In addition, the recovered oligomer can also be supplied into a polycondensation tank (a) illustrated in FIG. 2. In addition, the recovered oligomer can also be supplied into a slurry tank of an aliphatic dicarboxylic acid and an aliphatic diol.

<Drying Step>

The contact treated polyester pellets contain the contact treatment solution of ethanol, water, and the like, and therefore, in order to remove them, the polyester pellets are dried in a drying step.

Examples of a dryer which is used in the drying step include those in which an inert gas such as heated air, heated nitrogen, etc. is circulated as a drying gas, such as a plate-type dryer, a band dryer, a horizontal cylindrical rotary dryer, a rotary blade-equipped horizontal dryer, a rotary blade-equipped vertical dryer (so-called hopper dryer type dryer), a moving bed type vertical dryer, a fluidized bed type dryer, etc. In addition, examples of a dryer which is different from the foregoing gas circulation system include a double cone type rotary vacuum dryer, a tumbler type rotary vacuum dryer, a microwave dryer, and the like.

These can be carried out in any of a batchwise manner, a semi-batchwise manner, or a continuous manner. However, from the viewpoint of production efficiency, a continuous manner is preferable for the mass production. In addition, in view of the fact that the equipment does not become complicated, a moving bed type vertical dryer or an apparatus having a plurality of these dryers continuously arranged therein can be preferably used.

As for the drying temperature, a lower limit thereof is 25° C., preferably 30° C., more preferably 35° C., and especially preferably 40° C. in terms of a gas temperature. An upper limit thereof is generally a melting point of the polyester, preferably a temperature lower by 5° C. than a melting point of the polyester, more preferably a temperature lower by 8° C. than a melting point of the polyester, and especially preferably a temperature lower by 10° C. than a melting point of the polyester. When the temperature is lower than the lower limit, a long time is required for the drying time, and such is economically disadvantageous. On the other hand, when the temperature exceeds the upper limit, fusion between the pellets, pellet extraction failure at the time of extracting the pellets from the dryer, and the like are caused, possibly resulting in difficulty from the operation standpoint. The drying gas which has passed through the dryer contains the contact treatment liquid components such as water, ethanol, etc., and by reducing the contact treatment components by means of cooling or adsorption of the drying gas, or the like, it is possible to reuse the resulting gas as the drying gas.

The drying time is generally from 0.1 to 100 hours, preferably from 1 to 80 hours, and more preferably from 5 to 50 hours. In the case of a moving bed type, a flow rate of the drying gas is generally from 0.05 to 1.0 msec (superficial velocity). In the pellets after drying, an upper limit of the ethanol content is generally 1,000 ppm by mass, preferably 800 ppm by mass, and more preferably 500 ppm by mass. When the ethanol content is too high, a decrease of the metal viscosity at the time of melt molding of the present pellets is remarkable, so that molding failure tends to occur. Though it is good that a lower limit thereof is lower, it is generally 50 ppm by mass in terms of a concentration at which the pellets are rationally obtained on an industrial scale. In general, the moisture content of the pellet after drying is smaller than the ethanol content thereof. The moisture content of the pellet is not more than 1,000 ppm by mass, preferably not more than 500 ppm by mass, and more preferably not more than 250 ppm by mass. When the moisture content is too high, a decrease of the IV to be caused due to hydrolysis at the time of melt molding of the present pellets is remarkable, and molding failure occurs, so that physical properties of the molded article tend to decrease.

Production Process Example

A preferred embodiment of the production method of a polyester using, as raw materials, succinic acid as the aliphatic dicarboxylic acid, 1,4-butanediol (hereinafter sometimes abbreviated as "BG") as the aliphatic diol, and malic acid as the polyfunctional compound is hereunder described by reference to the following example. However, it should not be construed that the present invention is limited thereto.

Figure 2:
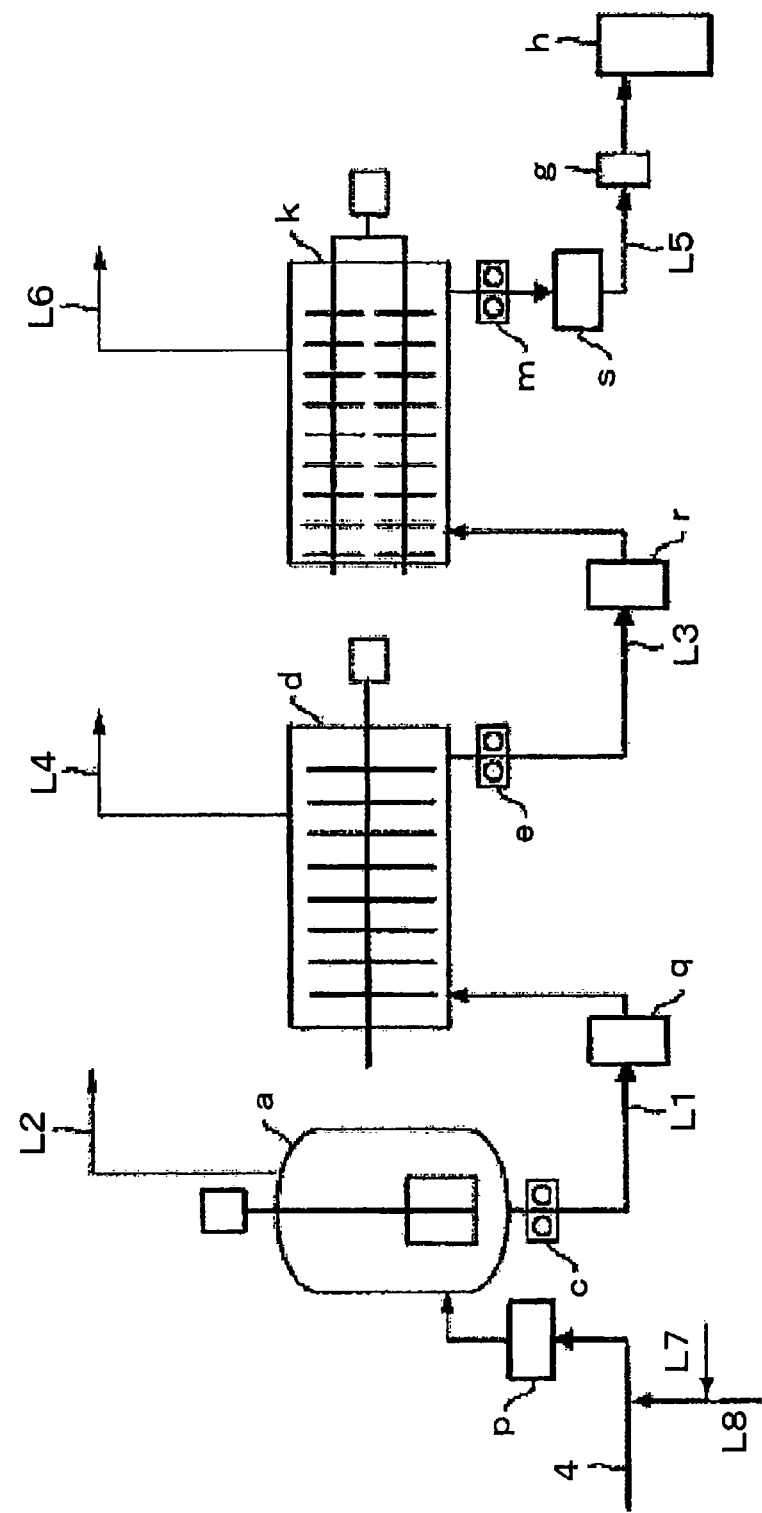
FIG. 2 is a diagrammatic view showing an exemplary embodiment of a polycondensation step which is adopted in the present invention.

The preferred embodiment of the production method of a polyester is hereunder described by reference to the accompanying drawings. FIG. 1 is an explanatory view of an example of the esterification reaction step which is adopted in the present invention, and FIG. 2 is an explanatory view of an example of the polycondensation step which is adopted in the present invention.

In FIG. 1, succinic acid and malic acid as the raw materials are generally mixed with BG in a raw material mixing tank (not shown) and supplied in a slurry or liquid state into an esterification reaction tank (A) from a raw material supply line (1). In addition, in the case of adding a catalyst at the time of esterification reaction, after forming a solution of BG in a catalyst preparation tank (not shown), the solution is supplied into a catalyst supply line (3). In FIG. 1, an embodiment in which the catalyst supply line (3) is connected to a recirculation line (2) of recirculated 1,4-butanediol, and the both are mixed and then supplied into a liquid phase part of the esterification reaction tank (A) is shown.

A gas distilled from the esterification reaction tank (A) is separated into a high boiling component and a low boiling component in a rectification column (C) through a distillation line (5). In general, a main component of the high boiling component is 1,4-butanediol, and a main component of the low boiling component is water and tetrahydrofuran (hereinafter sometimes abbreviated at "THF") that is a decomposition product of BG.

The high boiling component separated in the rectification column (C) is extracted from an extraction line (6), a part thereof is circulated into the esterification reaction tank (A) from the recirculation line (2) through a pump (D), and a part of the separated high boiling component is returned into the rectification column (C) from a circulation line (7). In addition, the excess is extracted to the outside from an extraction line (8). On the other hand, the low boiling component separated in the rectification column (C) is extracted from a gas extraction line (9), condensed in a condenser (G), and temporarily stored in a tank (F) through a condensate line (10). A part of the low boiling component collected in the tank (F) is returned into the rectification column (C) through an extraction line (11), a pump (E), and a circulation line (12), and the remainder is extracted to the outside through an extraction line (13). The condenser (G) is connected to an exhaust apparatus (not shown) through a vent line (14). An esterification reaction product formed in the esterification reaction tank (A) is supplied into a first polycondensation reaction tank (a) shown in FIG. 2 through an extraction pump (B) and an extraction line (4) of esterification reaction product.

In the step shown in FIG. 1, the catalyst supply line (3) is connected to the recirculation line (2). However, the both may be made independent from each other. In addition, the raw material supply line (1) may be connected to a liquid phase part of the esterification reaction tank (A).

In the case of adding the catalyst to an esterification reaction product before the polycondensation tank, the catalyst is prepared in a prescribed concentration in a catalyst preparation tank (not shown), connected to a raw material supply line (L8) through a catalyst supply line (L7) in FIG. 2, further diluted with BG, and then supplied into the extraction line (4) of esterification reaction product.

Subsequently, the esterification reaction product supplied into the first polycondensation reaction tank (a) through a filter (p) from the extraction line (4) of esterification reaction product is polycondensed under reduced pressure to form a polyester low polymer, and thereafter, the polyester low polymer is supplied into a second polycondensation reaction tank (d) through an extraction gear pump (c), an extraction line (L1), and a filter (q). In the second polycondensation reaction tank (d), in general, the polycondensation reaction further proceeds under a pressure lower than that in the first polycondensation reaction tank (a). The obtained polycondensation product is supplied into a third polycondensation tank (k) through an extraction gear pump (e), an extraction line (L3) that is an outlet flow passage, and a filter (r). The third polycondensation reaction tank (k) is a horizontal reaction tank which is constituted of plural stirring blade blocks and equipped with a twin-screw self-cleaning type stirring blade. The polycondensation reaction product introduced into the third polycondensation reaction tank (k) from the second polycondensation reaction tank (d) through the extraction line (L3) further undergoes a polycondensation reaction and is then transferred into a pelletization step.

In the pelletization step, the polyester in a molten state is extracted in a form of a molten strand from a die head (g) into the air through an extraction gear pump (m), a filter (s) that is an outlet flow passage, and an extraction line (L5), cooled with water or the like, and then cut by a rotary cutter (h), thereby forming polyester pellets. In addition, the polyester can also be extracted in a form of a strand into water without being extracted into the air and cut by a rotary underwater cutter, whereby the polyester can be formed into pellets.

In FIG. 2, reference numerals (L2), (L4), and (L6) are vent lines of the first polycondensation reaction tank (a), the second polycondensation reaction tank (d), and the third polycondensation reaction tank (k), respectively. It is not always necessary to arrange all of the filters (p), (q), (r), and (s). These can be properly arranged taking into consideration the extraneous matter removal effect and the operation stability.

Figure 3:
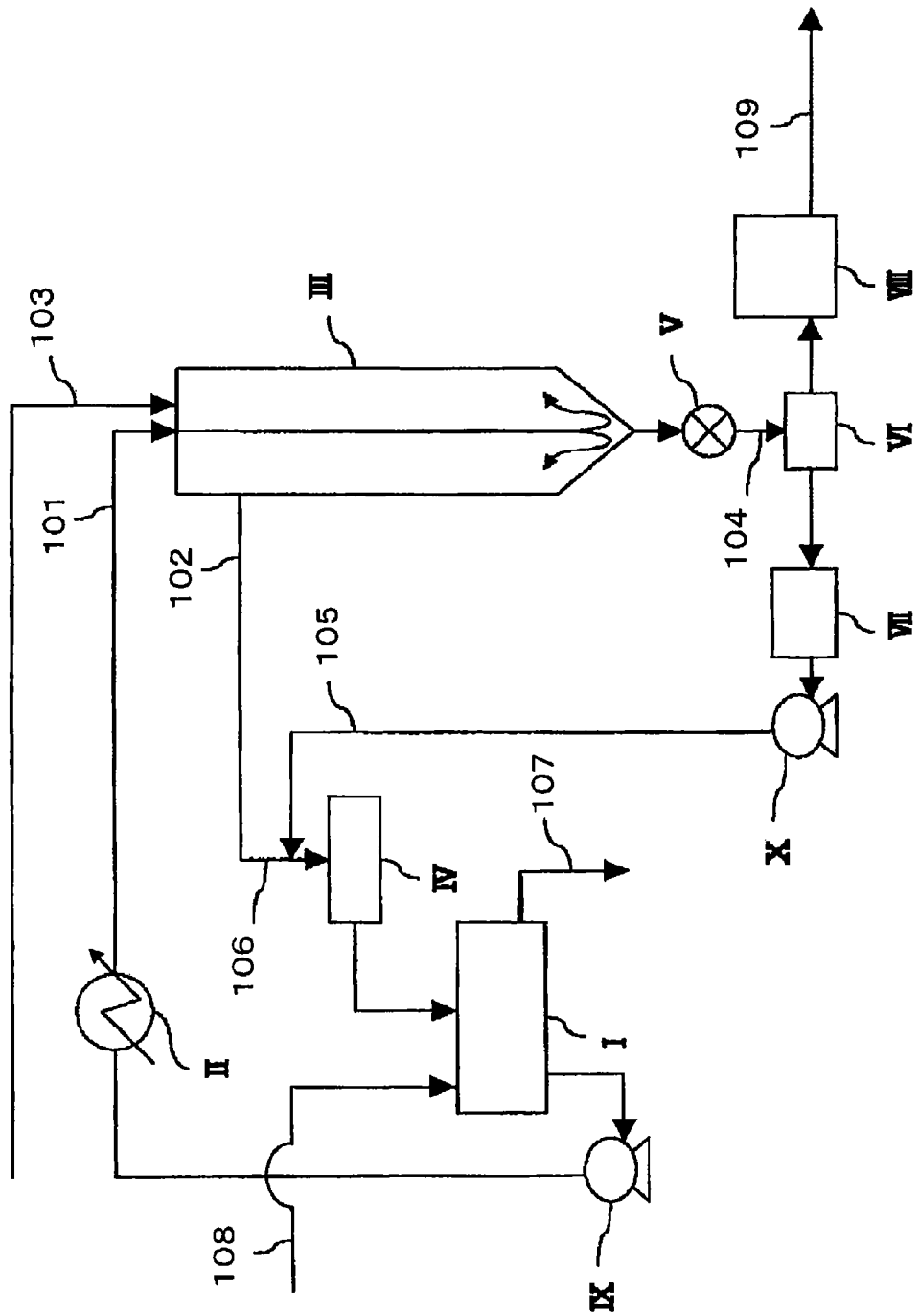
FIG. 3 is a diagrammatic view showing an exemplary embodiment of a contact treatment step which is adopted in the present invention.

FIG. 3 is an explanatory view of an example of a contact treatment step with a mixed solution containing ethanol and water which is adopted in the present invention. Ethanol/water as a contact treatment solution is subjected to temperature control through a heat exchanger (II) from a circulation tank (I) by a pump (IX) and supplied into a treatment tank (III) from a contact treatment solution supply line (101). The contact treatment solution is brought into countercurrent contact with the pellets in the treatment tank, extracted from an extraction line (102), and then recovered into the circulation tank (I) through a fine powder removal machine (IV).

The pellets to be provided for the contact treatment are continuously supplied from a pellet supply line (103), contact treated with ethanol/water for a prescribed time, and then continuously extracted from an extraction line (104) while adjusting an extraction amount by a rotary valve (V). The contact treatment solution which has been entrained with the pellets and extracted is separated by a preliminary solid-liquid separator (VI), and after going through a recovery tank (VII), the contact treatment solution is returned into a recovery line (106) through a supply line (105) by a pump (X). Extraction of the contact treatment solution is continuously carried out through an extraction line (107) from the circulation tank (I). Ethanol/water in an amount corresponding to the extracted contact treatment solution is supplied from a supply line (108). The continuously extracted pellets are separated from the entrained contact treatment solution by the preliminary solid-liquid separator and then continuously supplied into the drying step through a solid-liquid separator (VIII).

Figure 4:
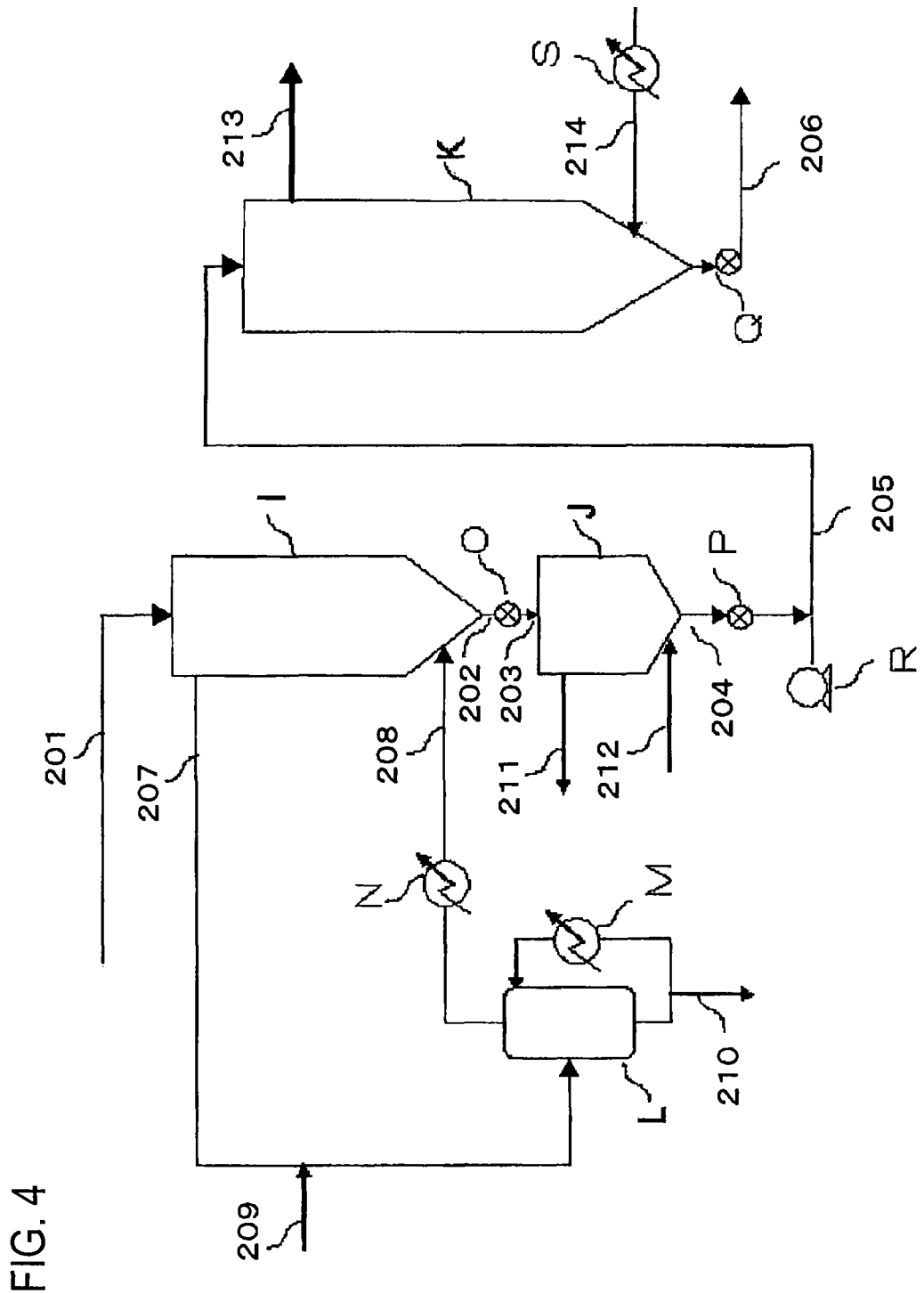
FIG. 4 is a diagrammatic view showing an exemplary embodiment of a drying step which is adopted in the present invention.

FIG. 4 is an explanatory view of an example of the drying step which is adopted in the present invention. FIG. 4 is concerned with an example in which two drying columns (I) and (K) are provided.

The polyester pellets after completion of the contact treatment step are continuously supplied into a first drying column (I) through a pellet supply line (201). A heated dry nitrogen gas is continuously introduced into the first drying column from a supply line (208) and discharged from a gas recovery line (207). The discharged gas is heated by a heat exchanger (N) through a condenser (L) and circulated into the first drying column and used through the supply line (208). The contact treatment solution condensed by the condenser (L) and a heat exchanger (M) is extracted from an extraction line (210). A new dry nitrogen gas is supplied from a new dry gas supply line (209). The pellets are continuously sent to a cooling column (J) from the first drying column through a rotary valve (O). Dry air is introduced into the cooling column from a cooling gas supply line (212) and released from a cooling gas extraction line (211).

The pellets which have been cooled on the lower temperature side than the drying temperature of the first drying column are supplied into a second drying column (K) through a pellet extraction line (204), a rotary valve (P), and a pellet supply line (205). A dry gas (generally air) is supplied into the second drying column through a heat exchanger (S) and a dry gas supply line (214) and discharged from an extraction line (213).

The temperature of air to be supplied into the second drying column is generally lower than the temperature of the nitrogen gas to be supplied to the first drying column, and for example, the nitrogen gas temperature is 80° C., whereas the air temperature is 50° C.

The polyester pellets after drying are continuously or intermittently extracted through a rotary valve (O) and a pellet extraction line (206) and formed into a product through a storage tank, a fine powder removal machine, a packaging machine, and the like. The storage tank can be allowed to also serve as the second drying column. In this FIG. 4, the storage tank, et seq. is not illustrated.

As for the content of the cyclic dimer of the polyester which is obtained in the present invention, a lower limit thereof is preferably 1 ppm by mass or more, more preferably 100 ppm by mass or more, still more preferably 500 ppm by mass or more, and especially preferably 1,000 ppm by mass or more. An upper limit thereof is generally not more than 6,000 ppm by mass, preferably not more than 5,000 ppm by mass, more preferably not more than 4,000 ppm by mass, and especially preferably not more than 3,500 ppm by mass. When the content of the cyclic dimer is less than the lower limit, though the polyester is good in terms of a quality, the size of equipment increases due to a long time required for removing an oligomer, and hence, such is economically disadvantageous. When the content of the cyclic dimer exceeds the upper limit, in the case of allowing the polyester after molding to stand for a certain period of time, cloudiness (synonymous with the bleedout or whitening phenomenon) is caused on the surface thereof, resulting in inconveniences such as varnishing of surface gloss, etc.

In addition, as for the elution amount when the polyester obtained in the present invention is molded into a sheet, which is then dipped in a 20% by mass ethanol aqueous solution at 60° C. for 30 minutes, an upper limit thereof is preferably not more than 30 µg/mL, more preferably not more than 28 µg/mL, and still more preferably not more than 25 µg/mL. When the elution amount exceeds the upper limit, among the standards and criteria for food and food additives, etc., the criteria for the apparatus and containers and packaging are not satisfied, and hence, the application to food containers and packaging is not admitted. Incidentally, the elution amount is a value measured in the method in the section of the Examples.

More preferably, the polyester according to the present invention has an intrinsic viscosity of 1.4 dL/g or more and not more than 2.8 dL/g and a cyclic dimer content of 500 ppm by mass or more and not more than 5,000 ppm by mass. According to this, the polyester can become a raw material of a good polyester molded article without impairing the quality after molding.

<Polyester Composition>

An aromatic/aliphatic copolymer polyester, an aliphatic oxycarboxylic acid, or the like may be compounded in the polyester according to the present invention. Furthermore, in addition to a carbodiimide compound, a filler, and a plasticizer which are used as the need arises, other biodegradable resins, for example, polycaprolactone, a polyamide, polyvinyl alcohol, a cellulose ester, etc.; animal/plant material fine powders such as starch, cellulose, paper, a wood powder, chitin and/or chitosan, a palm shell powder, a walnut shell powder, etc.; or mixtures thereof can be compounded in a range where the effects of the present invention are not impaired. Furthermore, an additive such as a thermal stabilizer, a plasticizer, a lubricant, an anti-blocking agent, a nucleating agent, an inorganic filler, a colorant, a pigment, an ultraviolet absorber, a light stabilizer, etc.; a modifier; a crosslinking agent; and the like may be contained for the purpose of adjusting physical properties or processability of a molded article.

Though the production method of a polyester composition of the present invention is not particularly limited, examples thereof include a method of melt mixing blended raw material chips of a polyester by the same extruder; a method of melting by separate extruders and then mixing; a method of mixing by kneading using ordinary kneading machines such as a single-screw extruder, a twin-screw extruder, a Banbury mixer, a roll mixer, a Brabender plastograph, a kneader blender, etc.; and the like. In addition, it is possible to directly supply each of raw material chips into a molding machine to prepare a composition and simultaneously obtain a molded article thereof.

EXAMPLES

The present invention is hereunder described in more detail with reference to the Examples, but it should be construed that the present invention is not limited to the following Examples at all so far as it does not deviate from the gist thereof. Incidentally, the measurement methods of the physical properties and evaluation items adopted in the following various Examples are as follows.

<Intrinsic Viscosity (IV), dL/g>

The intrinsic viscosity was determined using an Ubbelohde viscometer according to the following manner. That is, a mixed solvent of phenol/tetrachloroethane (mass ratio: 1/1) was used, the number of seconds in dropping of each of a polymer solution having a concentration of 0.5 g/dL and only the solvent was measured at 30° C., and the intrinsic viscosity was determined according to the following equation (1).

$$IV=((1+4K_H\eta_{sp})^{0.5}-1)/(2K_HC) \quad (1)$$

In the equation (1), $\eta_{sp}=\eta/\eta_0-1$; $\eta$ is the number of seconds in dropping of a sample solution; $\eta_0$ is the number of seconds in dropping of a solvent; C is a concentration of a sample solution (g/dL); and $K_H$ represents a Huggins constant. 0.33 was employed as $K_H$.

<Esterification Ratio (%)>

The esterification ratio was calculated from an acid value and a saponification value of a sample according to the following calculation equation (2). The acid value was determined by heating 0.3 g of an esterification reaction product sample in 40 mL of benzyl alcohol at 180° C. for 20 minutes, cooling for 10 minutes, and then titrating with 0.1 mol/L of a potassium hydroxide/methanol solution. The saponification value was determined by hydrolyzing an oligomer with 0.5 mol/L of a potassium hydroxide/ethanol solution and then titrating with 0.5 mol/L of hydrochloric acid.

$$\text{Esterification ratio (\%)}=\{(\text{Saponification value})-(\text{Acid value})\}/(\text{Saponification value})\times 100 \quad (2)$$

<Terminal Carboxyl Group Concentration of Polyester (AV), Equivalent/Ton>

The polyester in the form of a pellet was pulverized, dried by a hot air dryer at 140° C. for 15 minutes, and then cooled to room temperature in a desiccator. 0.1 g of the thus prepared sample was precisely weighed and collected in a test tube, to which was then added 3 mL of benzyl alcohol, and the sample was dissolved at 195° C. for 3 minutes while blowing a dry nitrogen gas. Subsequently, 5 cm³ of chloroform was gradually added, and the mixture was cooled to room temperature. To this solution, one or two drops of a Phenol Red indicator were added, and the solution was titrated with a benzyl alcohol solution of 0.1 mol/L of sodium hydroxide under stirring while blowing a dry nitrogen gas. At a point of time when a yellow color changed to a red color, the titration was terminated. In addition, as a blank, the same operations were carried out without adding the polyester sample, and the terminal carboxyl group concentration (acid value) was calculated according to the following equation (3).

$$\text{Terminal carboxyl group concentration (equivalent/ton)} = (a-b) \times 0.1 \times f/W \quad (3)$$

Here, a is an amount (µL) of the benzyl alcohol solution of 0.1 mol/L of sodium hydroxide required for the titration; b is an amount (µL) of the benzyl alcohol solution of 0.1 mol/L of sodium hydroxide required for the titration at blank; W is an amount (g) of the polyester sample; and f is a factor of the benzyl alcohol solution of 0.1 mol/L of sodium hydroxide.

Incidentally, the factor (f) of the benzyl alcohol solution of 0.1 mol/L of sodium hydroxide was determined by the following method. 5 cm$^3$ of methanol was collected in a test tube, to which was then added one or two drops of an ethanol solution of Phenol Red as an indicator, and titration with 0.4 cm$^3$ of a benzyl alcohol solution of 0.1 mol/L of sodium hydroxide was carried out until a point of color change. Subsequently, 0.2 cm$^3$ of 0.1 mol/L of a hydrochloric acid aqueous solution having a known factor was collected as a standard solution and added, and titration with of a benzyl alcohol solution of 0.1 mol/L of sodium hydroxide was again carried out until a point of color change (the foregoing operations were carried out while blowing a dry nitrogen gas). Then, the factor (f) was calculated according to the following equation (4).

$$\text{Factor } (f) = (\text{Factor of 0.1 mol/L of hydrochloric acid aqueous solution}) \times (\text{Collected amount of 0.1 N of hydrochloric acid aqueous solution (µL)})/(\text{Titrated amount of benzyl alcohol solution of 0.1 mol/L of sodium hydroxide (µL)}) \quad (4)$$

<Quantitative Determination of Cyclic Dimer Content of Pellet, ppm by Mass>

0.5 g of a sample was precisely weighed, to which was then added 10 mL of chloroform, and the sample was dissolved at room temperature. Thereafter, 30 mL of an ethanol/water mixed solution (volume ratio: 4/1) was gradually added dropwise under stirring, thereby precipitating a polymer component. After 15 minutes, the stirring was stopped, and the contents were allowed to stand for separation for 90 minutes. Subsequently, 2 mL of a supernatant was collected and evaporated to dryness, and 2 mL of acetonitrile was then added for dissolution. The solution was filtered with a filter having an opening of 0.45 µm, and thereafter, the CD was quantitatively determined using a liquid chromatograph "LC-10", manufactured by Shimadzu Corporation using acetonitrile/water (volume ratio: 4/6) as a mobile phase and "SHISEIDOCAPCELL PAK C-18 TYPE MG", manufactured by Shiseido Company, Limited as a column, and expressed in terms of ppm by mass relative to the pellets. For the quantitative determination of the CD, the absolute calibration method using a cyclic dimer pure product was adopted. The cyclic dimer pure product was obtained in the following manner. That is, polymer pellets obtained by polymerizing succinic acid and 1,4-butanediol were stirred in acetone at 50° C. for 12 hours, and an oligomer component was extracted. After completion of the extraction, the pellets were filtered off, and acetone was volatilized from the acetone solution from which the oligomer component had been extracted, thereby obtaining a solid. This solid was dissolved in acetone at 50° C. so as to form a saturated solution, and then gradually cooled. A supernatant was disposed, and an acicular deposit was taken out and further purified by repeating a recrystallization operation several times. This acicular deposit was confirmed to be a cyclic dimer by means of $^1$H-NMR analysis and high-performance liquid chromatographic analysis.

<Solution Haze>

2.70 g of a polyester sample was put in 20 mL of a mixed solution of phenol/tetrachloroethane (weight ratio: 3/2) and dissolved at 110° C. for 30 minutes. Thereafter, this solution was cooled in a constant temperature water bath at 30° C. for 15 minutes, and a turbidity of the solution was measured in a cell having an optical path length of 10 mm using a turbidimeter "NDH-300A", manufactured by Nippon Denshoku Industries Co., Ltd. and defined as a solution haze. It is meant that the lower the value, the better the transparency is.

<Measurement of Elution Amount, µg/mL>

On a metal plate, a Teflon (registered trademark) sheet and a metal frame having a thickness of 6 mm (outside: 240×240 mm, inside: 200×200 mm) were placed, 30 g of a resin was uniformly spread in the frame, and a Teflon (registered trademark) sheet and a metal plate were successively placed thereon. A set of them was put in an electric heating pressing machine heated at 200° C. After preheating for 2 minutes without applying a pressure, the metal plate set was heated under a pressure of 100 kg/cm$^2$ for 2 minutes and then taken out. The metal plate set was put in a cold water circulation type cold press, pressurized under a pressure of 100 kg/cm$^2$, and then cooled for 2 minutes. The cooled metal plate set was taken out, the resin pressed piece (200 mm×200 mm×6 mm) was taken out, and the sample was cut out in a size of 50 mm×70 mm. The cut-out pressed sheet having a thickness of 0.6 mm was dipped in a 20% by mass ethanol aqueous solution in a proportion of 2 mL per cm$^2$ and heated at 60° C. for 30 minutes. The pressed sheet was removed by means of filtration, a filtrate was evaporated to dryness, and the residue was heat dried at 105° C. for 2 hours. A mass after drying was weighed, and the elution amount (µg/mL) was calculated therefrom.

<Quantitative Determination of Alcohol in Pellet, ppm by Mass>

4 g of a sample and 16 g of pure water are precisely weighed and charged in a closed pressure-resistant container, and the container is dipped in an oil bath, a temperature of which has been elevated to 100° C., for 4 hours. 4 hours later, the container is extracted from the oil bath and then cooled. After cooling, the liquid in the container is collected and quantitatively determined using a gas chromatograph "GC-14B", manufactured by Shimadzu Corporation using "DB-1", manufactured by Agilent Technologies, Inc. as a column, and expressed in terms of ppm by mass relative to the pellets. For the quantitative determination of ethanol and isopropanol, the absolute calibration method was adopted.

<Quantitative Determination of Moisture in Pellet, ppm by Mass>

About 1 g of a sample was heated in a nitrogen gas stream at 210° C. for about 10 minutes by a moisture evaporator ("VA-2000", manufactured by Mitsubishi Chemical Analytech Co., Ltd.), thereby evaporating the moisture contained in the sample into the nitrogen gas stream. Then, the moisture content contained in the nitrogen gas stream was measured by the coulometric titration method using a Karl Fischer moisture meter ("CA-200", manufactured by Mitsubishi Chemical Analytech Co., Ltd.) and expressed in terms of ppm by mass relative to the pellets.

<Melt Viscosity MVR (cm$^3$/10 Min)>

As the measurement method, a method specified in JIS K7210 is adopted. The melt viscosity was measured at a measurement temperature of 190° C. and a use load of 2.16 kg and at an orifice diameter of 1.0 mm using a melt indexer "L242", manufactured by Technol Seven Co., Ltd. It is meant that the larger the numerical value, the lower the melt viscosity is.

<Color b Value>

The polyester in a state of pellets was filled in a powder measurement cell of a columnar shape having an internal diameter of 30 mm and a depth of 12 mm. Using a colorimeter Z300A (manufactured by Nippon Denshoku Industries Co., Ltd.), a color coordinate value b of the Hunter's color difference formula in the Lab display system described in Reference Example 1 of JIS Z8730 was measured in four places by the reflection method while rotating the measurement cell at every 90°, and an arithmetic average value thereof was determined.

Example 1

Preparation of Polycondensation Catalyst 100 parts by mass of magnesium acetate tetrahydrate was put in a glass-made eggplant-shaped flask equipped with a stirring apparatus, and 1,500 parts by mass of anhydrous ethanol (purity: 99% by mass or more) was further added. Furthermore, 65.3 parts by mass of ethyl acid phosphate (a mixing mass ratio of a monoester form and a diester form is 45/55) was added, followed by stirring at 23° C. 15 minutes later, after confirming that the magnesium acetate had been completely dissolved, 122 parts by mass of tetra-n-butyl titanate was added. Stirring was further continued for 10 minutes to obtain a uniform mixed solution. This mixed solution was transferred into an eggplant-shaped flask and concentrated in an oil bath at 60° C. under a reduced pressure by an evaporator. One hour later, almost all of the ethanol was distilled away to obtain a semitransparent viscous liquid. The temperature of the oil bath was further elevated to 80° C., and concentration was further carried out under reduced pressure of 5 Torr to obtain a viscous liquid. This liquid catalyst was dissolved in 1,4-butanediol and adjusted such that the titanium atom content was 3.36% by mass. The storage stability of this catalyst solution in 1,4-butanediol was good. In the catalyst solution stored at 40° C. in a nitrogen atmosphere, the formation of a deposit was not perceived for at least 40 days. In addition, this catalyst solution had a pH of 6.3.

[Production of Polyester]

A polyester was produced in the following manner by the esterification step shown in FIG. 1 and the polycondensation step shown in FIG. 2. First of all, a slurry at 50° C., which was prepared by mixing 1.30 moles of 1,4-butanediol and malic acid in a proportion of 0.0033 moles in total amount relative to 1.00 mole of succinic acid containing 0.18% by mass of malic acid, was continuously supplied at a rate of 45.5 kg/hr into the esterification reaction tank (A) having a stirring machine, which was previously filled with a polyester low polymer having an esterification ratio of 99% by mass in a nitrogen atmosphere, from a slurry preparation tank (not shown) through the raw material supply line (1).

The esterification reaction tank (A) was adjusted at an inner temperature of 230° C. and a pressure of 101 kPa. Formed water and tetrahydrofuran and excessive 1,4-butanediol were distilled from the distillation line (5) and separated into a high boiling component and a low boiling component in the rectification column (C). After the system was stabilized, a part of the high boiling component at the column bottom was extracted to the outside through the extraction line (8) such that the liquid level of the rectification column (C) became constant. On the other hand, the low boiling component composed mainly of water and tetrahydrofuran was extracted in a form of gas from the column top, condensed in the condenser (G), and then extracted to the outside from the extraction line (13) such that the liquid level of the tank (F) became constant. Simultaneously, the whole amount of the column bottom component (98% by mass or more thereof being 1,4-butanediol) of the rectification column (C) at 100° C. was supplied from the recirculation line (2), and 1,4-butanediol in an equimolar amount to tetrahydrofuran formed in the esterification reaction tank was also supplied from the raw material supply line (1), followed by adjusting such that the molar ratio of 1,4-butanediol to succinic acid in the esterification reaction tank was 1.30. The supply amount was 3.8 kg/hr in total of those in the recirculation line (2) and the raw material supply line (1). In addition, the conversion amount of 1,4-butanedil into tetrahydrofuran was 0.042 moles to 1.00 mole of succinic acid (THF conversion rate: 4.2% by mole relative to succinic acid).

The esterification reaction product formed in the esterification reaction tank (A) was continuously extracted from the extraction line (4) of esterification reaction product using the pump (B), and the liquid level was controlled such that an average retention time in terms of a succinic acid unit of an internal liquid of the esterification reaction tank (A) was 3 hours. The esterification reaction product extracted from the extraction line (4) was continuously supplied into the first polycondensation reaction tank (a) shown in FIG. 2. After the system was stabilized, the esterification reaction product was collected at the outlet of the esterification reaction tank (A) and found to have an esterification ratio of 92.4% and a terminal carboxyl group concentration of 884 equivalents/ton.

A catalyst solution was prepared by diluting the catalyst solution previously prepared by the foregoing method with 1,4-butanediol such that the concentration as a titanium atom was 0.12% by mass and then continuously supplied into the extraction line (4) of esterification reaction product at a rate of 1.4 kg/h through the supply line (L8) (the catalyst was added to a liquid phase of the reaction solution). The supply amount was stable during the operation period.

The first polycondensation reaction tank (a) was adjusted at an inner temperature of 240° C. and a pressure of 2.7 kPa, and the liquid level was controlled such that the retention time was 120 minutes. An initial polycondensation reaction was carried out while extracting water, tetrahydrofuran, and 1,4-butanediol from the vent line (L2) connected to a pressure reducing device (not shown). The extracted reaction solution was continuously supplied into the second polycondensation reaction tank (d).

The second polycondensation reaction tank (d) was adjusted at an inner temperature of 240° C. and a pressure of 400 Pa, and the liquid level was controlled such that the retention time was 120 minutes. The polycondensation reaction was allowed to further proceed while extracting water, tetrahydrofuran, and 1,4-butanediol from the vent line (L4) connected to a pressure reducing device (not shown). The obtained polyester was continuously supplied into the third polycondensation reaction tank (k) through the extraction line (L3) by the extraction gear pump (e).

The third polycondensation reaction tank (k) was adjusted at an inner temperature of 240° C. and a pressure of 130 Pa, and the polycondensation reaction was allowed to further proceed for a retention time of 120 minutes. The obtained polyester was continuously extracted in a strand form from the die head (g) and cut by the rotary cutter (h) while cooling with water, thereby forming pellets. The esterification reaction and the polycondensation reaction were continuously carried out for 7 days, and after elapsing 16 hours after the start of the reaction, sampling was carried out at intervals of every 8 hours. Physical properties of each of the obtained polyesters were measured. An average value and a width of deflection of each of the samples are shown. The intrinsic viscosity was 1.85±0.02 dL/g; the terminal carboxyl group concentration was 19±1 equivalents/ton; the color b value was 1.9±0.1; the solution haze was 0.4±0.1%; and the pellet weight was 19±1 mg/grain. Polyester pellets having a stable quality were obtained. The pellet weight was reduced as one grain by measuring the weight of 100 grains.

[Contact Treatment of Polyester Pellets with Mixed Solution Containing Ethanol and Water]

The obtained polyester pellets were subjected to a contact treatment by the contact treatment step shown in FIG. 3. The mixed solution of ethanol and water to be used as the contact treatment solution was controlled at 70° C. through the heat exchanger (II) from the circulation tank (I) by the pump (IX) and supplied into the treatment tank (III) from the supply line (101). As for the proportion of ethanol (hereinafter sometimes abbreviated as "EtOH") and water of the contact treatment solution, the proportion of water was adjusted at 90% by mass relative to the whole of the contact treatment solution. A mass ratio of the contact treatment solution and the pellets ((treatment solution)/(pellets) ratio) in the treatment tank was set at 5.

The contact treatment solution was brought into countercurrent contact with the pellets in the treatment tank, extracted from the extraction line (102), and then recovered into the circulation tank (I) through the fine powder removal machine (IV). The pellets to be provided for the contact treatment were continuously supplied from the supply line (103), contact treated with the contact treatment solution for 8 hours, and then continuously extracted from the extraction line (104) by the rotary valve (V).

The extracted contact treatment solution which had been entrained with the pellets was separated by the preliminary solid-liquid separator (VI), and after going through the recovery tank (VII), the contact treatment solution was returned into the recovery line (106) through the supply line (105) by the pump (X). Extraction of the contact treatment solution was continuously carried out through the extraction line (107) from the circulation tank (I). Its amount was set at 1/20 (flow ratio) of a total circulation flow rate of the contact treatment solution. Ethanol and water in an amount corresponding to the extracted contact treatment solution was supplied into the circulation tank (I) from the supply line (108). The continuously extracted pellets were separated from the entrained contact treatment solution by the preliminary solid-liquid separator (IV) and then continuously supplied into the drying step from the solid-liquid separator (VIII) through an extraction line (109).

[Drying of Pellets]

Drying was carried out by the drying step shown in FIG. 4. In the first drying column, drying was carried out using a dry nitrogen gas having a purity of 99% or more (dew point: minus 40° C.) at a gas temperature of 80° C. and a gas (superficial) velocity of 0.125 msec for a pellet retention time of 15 hours; and in the second drying column, drying was carried out using dry air (dew point: minus 40° C.) at a temperature of 50° C. and a gas (superficial) velocity of 0.125 m/sec for a pellet retention time of 24 hours.

A ratio of the intrinsic viscosity measured regarding each of the samples after drying to the intrinsic viscosity before the contact treatment (expressed in terms of a retention ratio %), and the cyclic dimer content of the sample after drying and the pellet weight are shown in Table 1.

Example 2 to Example 7 and Comparative Example 1

The contact treatment was carried out in the same manner as that in Example 1, except that in Example 1, each of the composition of the contact treatment solution and the contact treatment time was changed as shown in Table 1. The results obtained are shown in Table 1.

Example 8

Polyester pellets were obtained by carrying out polycondensation in the same manner as that in Example 1, except that in Example 1, the polyester was extracted from the third polycondensation tank by replacing the extraction line (L3) with a piping having a length of 4 times. The obtained polyester had an intrinsic viscosity of 1.85±0.02 dL/g, a terminal carboxyl group concentration of 30±1 equivalents/ton, a color b value of 2.0±0.1, and a solution haze of 0.4±0.1%, and it was a polyester pellet having a stable quality. The obtained pellets were subjected to a contact treatment in the same manner as that in Example 1, except that in Example 1, each of the composition of the contact treatment solution and the contact treatment time was changed as shown in Table 1. The results obtained are shown in Table 1.

Example 9

The same procedures as those in Example 3 were followed, except that in Example 3, the cutter speed at the time of pelletization after the melt polycondensation was altered to change the pellet weight to 30±1 mg/grain. The results obtained are shown in Table 1.

Examples 10 and 11 and Comparative Example 4

The contact treatment was carried out in the same manner as that in Example 1, except that in Example 1, each of the composition of the contact treatment solution and the temperature of the contact treatment solution was changed as shown in Table 1. The ratio of the intrinsic viscosity to the intrinsic viscosity before the contact treatment (expressed in terms of a retention ratio %), the CD content, the elution amount, the content of ethanol (however, isopropanol in Comparative Example 4) in the pellets after drying, and the melt viscosity MVR were measured in the same manners as those in Example 1. The results obtained are shown in Table 2.

Comparative Examples 2, 3 and 5

The contact treatment was carried out in the same manner as that in Example 10, except that in Example 10, the ethanol used in the contact treatment solution was changed to methanol (hereinafter sometimes abbreviated as "MeOH"), acetone, and isopropanol (hereinafter sometimes abbreviated as "IPA"), respectively. The ratio of the intrinsic viscosity to the intrinsic viscosity before the contact treatment (expressed in terms of a retention ratio %), the CD content, and the elution amount were measured in the same manners as those in Example 1. The results obtained are shown in Table 2.

TABLE 1

|  |  |  | Example 1 | Example 2 | Example 3 | Example 4 | Example 5 | Example 6 |
|---|---|---|---|---|---|---|---|---|
| Composition of contact treatment solution | Water | % by mass | 90 | 80 | 70 | 50 | 30 | 10 |
|  | Ethanol | % by mass | 10 | 20 | 30 | 50 | 70 | 90 |
|  | Isopropanol | % by mass | 0 | 0 | 0 | 0 | 0 | 0 |
| Contact temperature |  | °C. | 70 | 70 | 70 | 70 | 70 | 70 |
| Contact time |  | hr | 8 | 4 | 4 | 4 | 4 | 4 |
| IV retention ratio |  | % | 97.6 | 98.0 | 97.8 | 97.6 | 97.5 | 97.4 |
| Cyclic dimer content |  | ppm by mass | 3900 | 3700 | 3400 | 2800 | 2300 | 2500 |
| Terminal carboxyl group concentration |  | equivalents/ton | 19 ± 1 | 19 ± 1 | 19 ± 1 | 19 ± 1 | 19 ± 1 | 19 ± 1 |
| Pellet weight |  | mg/grain | 23 | 23 | 23 | 23 | 23 | 23 |

|  |  |  | Example 7 | Example 8 | Example 9 | Comparative Example 1 |
|---|---|---|---|---|---|---|
| Composition of contact treatment solution | Water | % by mass | 70 | 50 | 70 | 0 |
|  | Ethanol | % by mass | 28.5 | 50 | 30 | 100 |
|  | Isopropanol | % by mass | 1.5 | 0 | 0 | 0 |
| Contact temperature |  | °C. | 70 | 70 | 70 | 70 |
| Contact time |  | hr | 4 | 4 | 4 | 4 |
| IV retention ratio |  | % | 98.1 | 97.2 | 97.8 | 93.9 |
| Cyclic dimer content |  | ppm by mass | 3500 | 2800 | 4000 | 3100 |
| Terminal carboxyl group concentration |  | equivalents/ton | 19 ± 1 | 30 ± 1 | 19 ± 1 | 19 ± 1 |
| Pellet weight |  | mg/grain | 23 | 23 | 30 | 23 |

TABLE 2

|  |  |  | Example 10 | Example 11 | Comparative Example 2 | Comparative Example 3 | Comparative Example 4 | Comparative Example 5 |
|---|---|---|---|---|---|---|---|---|
| Composition of contact treatment solution | Alcohol species * |  | EtOH | EtOH | MeOH | Acetone * | IPA | MeOH |
|  | Water | % by mass | 70 | 20 | 70 | 70 | 70 | 20 |
|  | Alcohol | % by mass | 30 | 80 | 30 | 30 | 30 | 80 |
| Contact temperature |  | °C. | 60 | 60 | 60 | 60 | 60 | 60 |
| Contact time |  | hr | 8 | 8 | 8 | 8 | 8 | 8 |
| IV retention ratio |  | % | 97.8 | 97.4 | 96.8 | 98.6 | 98.1 | 95.0 |
| Cyclic dimer content |  | ppm by mass | 3800 | 2700 | 4300 | 4500 | 4000 | 4100 |
| Elution amount |  | μg/ml | 24 | 20 | 34 | 31 | 32 | 33 |
| Alcohol amount in pellet after drying |  | ppm by mass | 400 | 700 | — | — | 3300 | — |
| Melt viscosity MVR |  | cm³/10 min | 4.1 | 4.7 | — | — | 8.5 | — |

* In Comparative Example 3, acetone but not the alcohol was used.
In the table, the symbol "—" means that the measurement was not made.

As shown in Table 1, in the case where the content of water in the ethanol/water mixed solution is 0% by mass (Comparative Example 1), the IV retention ratio is low, and a decrease of the viscosity which is supposed to be caused due to decomposition of the alcohol occurs, so that the quality of the polyester is deteriorated. In addition, as shown in Table 2, in the case where the ethanol used in the contact treatment solution to be brought into contact with the polyester pellets is replaced by other organic solvent (alcohol or ketone) (Comparative Examples 2, 3, 4 and 5), as compared with the case of using ethanol, the effect for reducing the CD content is inferior, and the elution amount increases. In particular, in the case of using methanol, a decrease of the intrinsic viscosity during the contact treatment is large, the IV retention ratio is low, and the quality of the polyester is deteriorated (Comparative Examples 2 and 5). In the case of using isopropanol, the amount of isopropanol in the pellets after drying is high, and the MVR is large.

On the other hand, in the case of bringing into contact with the mixed solution containing ethanol and water according to the present invention, not only a decrease of the quality such as a decrease of the IV, etc. is small, but the reduction of the CD content can be efficiently achieved, so that a polyester with a low CD content and a low elution amount can be obtained.

While the invention has been described in detail and with reference to specific embodiments thereof, it will be apparent to one skilled in the art that various changes and modifications can be made therein without departing from the spirit and scope thereof. This application is based on a Japanese patent application filed on Sep. 27, 2010 (Application No. 2010-215641), the content thereof being incorporated herein by reference.

INDUSTRIAL APPLICABILITY

According to the production method of the present invention, a polyester with a reduced CD content and a low elution amount can be efficiently obtained, and it is possible to provide a raw material polyester of a molded article such that when formed into a molded article, cloudiness is not generated on the surface thereof.

EXPLANATIONS OF REFERENCE SIGNS

1: Raw material supply line
2: Recirculation line
3: Catalyst supply line
4: Extraction line of esterification reaction product
5: Distillation line
6: Extraction line
7: Circulation line
8: Extraction line
9: Gas extraction line
10: Condensate line
11: Extraction line
12: Circulation line
13: Extraction line
14: Vent line
15: Supply line
A: Esterification reaction tank
B: Extraction pump
C: Rectification column
D: Pump
E: Pump
F: Tank
G: Condenser
L1, L3, L5: Polycondensation reaction product extraction line
L2, L4, L6: Vent line
L7: Catalyst supply line
L8: Raw material supply line
a: First polycondensation reaction tank
d: Second polycondensation reaction tank
k: Third polycondensation reaction tank
c, e, m: Extraction gear pump
g: Die head
h: Rotary cutter
p, q, r, s: Filter
I: Circulation tank
II: Heat exchanger
III: Contact treatment tank
IV: Fine powder removal machine
V: Rotary valve
VI: Preliminary solid-liquid separator
VII: Recovery tank
VIII: Solid-liquid separator
IX: Pump
X: Pump
101: Contact treatment solution supply line
102: Extraction line
103: Pellet supply line
104: Extraction line
105: Supply line
106: Recovery line
107: Extraction line
108: Supply line
109: Extraction line
I: First drying column
J: Cooling column
K: Second drying column
L: Condenser
M: Heat exchanger
N: Heat exchanger
O: Rotary valve
P: Rotary valve
Q: Rotary valve
R: Blower
S: Heat exchanger
201: Pellet supply line
202: Pellet extraction line
203: Pellet supply line
204: Pellet extraction line
205: Pellet supply line
206: Pellet extraction line
207: Dry gas recovery line
208: Dry gas supply line
209: New dry gas supply line
210: Condensate extraction line
211: Cooling gas extraction line
212: Cooling gas supply line
213: Dry gas extraction line
214: Dry gas supply line

The invention claimed is:

1. A method for producing a polyester, comprising:
an esterification reaction of allowing an aliphatic diol and an aliphatic dicarboxylic acid to react with each other;
pelletizing a polyester obtained through the esterification reaction; and
a contact treatment of bringing obtained polyester pellets into contact with a mixed solution comprising isopropanol, ethanol and water,
wherein the mixed solution contains water in an amount of 10% by mass or more and not more than 99% by mass relative to the whole of the mixed solution, and
wherein the isopropanol is present in an amount of greater than 0 and not more than 15% by mass relative to the whole amount of the mixed solution.

2. The method for producing a polyester according to claim 1,
wherein a temperature at which the polyester pellets are brought into contact with the mixed solution is 25° C. or higher and not higher than a melting point of the polyester.

3. The method for producing a polyester according to claim 1,
wherein an oligomer extracted into the mixed solution by the contact of the polyester pellets with the mixed solution is used as a raw material of the polyester.

4. The method for producing a polyester according to claim 1, comprising:
drying after the contact treatment,
wherein the polyester after the drying contains not more than 1,000 ppm by mass of ethanol.

5. A polyester obtained by the production method according to claim 1, which has an intrinsic viscosity of 1.4 dL/g or more and not more than 2.8 dL/g and a content of a cyclic dimer of 500 ppm by mass or more and not more than 6,000 ppm by mass.

6. The polyester according to claim 5, which has a terminal carboxyl group concentration of not more than 80 (equivalents/ton) and 5 (equivalents/ton) or more.

7. The method for producing a polyester according to claim 1,
wherein the water is present in an amount of 20% by mass or more relative to the whole of the mixed solution.

8. The method for producing a polyester according to claim 1,
wherein the water is present in an amount of 25% by mass or more relative to the whole of the mixed solution.

9. The method for producing a polyester according to claim 1,
wherein the water is present in an amount not more than 95% by mass relative to the whole of the mixed solution.

10. The method for producing a polyester according to claim 1, wherein the water is present in an amount not more than 90% by mass relative to the whole of the mixed solution.

11. The method for producing a polyester according to claim 1,
wherein the water is present in an amount not more than 85% by mass relative to the whole of the mixed solution.

12. The method for producing a polyester according to claim 1,
wherein the isopropanol is present in an amount of not more than 10% by mass relative to the whole amount of the mixed solution.

13. The method for producing a polyester according to claim 1,
wherein the isopropanol is present in an amount of from 1.5% by mass to not more than 15% by mass relative to the whole amount of the mixed solution.

* * * * *